US011907338B2

(12) United States Patent
Singhal et al.

(10) Patent No.: US 11,907,338 B2
(45) Date of Patent: Feb. 20, 2024

(54) RETRIEVING IMAGES THAT CORRESPOND TO A TARGET SUBJECT MATTER WITHIN A TARGET CONTEXT

(71) Applicant: Adobe Inc., San Jose, CA (US)

(72) Inventors: Gourav Singhal, Delhi (IN); Sourabh Gupta, Noida (IN); Mrinal Kumar Sharma, Hazaribagh (IN)

(73) Assignee: Adobe Inc., San Jose, CA (US)

( * ) Notice: Subject to any disclaimer, the term of this patent is extended or adjusted under 35 U.S.C. 154(b) by 292 days.

(21) Appl. No.: 17/158,170

(22) Filed: Jan. 26, 2021

(65) Prior Publication Data

US 2022/0237417 A1  Jul. 28, 2022

(51) Int. Cl.
  *G06F 18/00* (2023.01)
  *G06F 18/24* (2023.01)
  (Continued)

(52) U.S. Cl.
  CPC ........... *G06F 18/24* (2023.01); *G06F 3/14* (2013.01); *G06F 18/214* (2023.01); *G06N 3/045* (2023.01); *G06N 3/08* (2013.01); *G06T 7/0002* (2013.01); *G06V 10/22* (2022.01); *G06V 10/25* (2022.01); *G06V 10/40* (2022.01); *G06T 2207/20084* (2013.01); *G06T 2207/30168* (2013.01)

(58) Field of Classification Search
  CPC ...... G06K 9/6267; G06K 9/6256; G06F 3/14; G06N 3/0454; G06N 3/08; G06T 7/0002; G06T 2207/20084; G06T 2207/30168; G06V 10/22; G06V 10/25; G06V 10/40; G06V 10/82; G06V 10/235; G06V 10/809; G09G 2354/00; G09G 2370/022; G09G 2380/04
  See application file for complete search history.

(56) References Cited

U.S. PATENT DOCUMENTS

2019/0147305 A1\* 5/2019 Lu .................. G06F 18/2413
                                                   382/157
2019/0318405 A1\* 10/2019 Hu ..................... G06V 20/00
(Continued)

OTHER PUBLICATIONS

Ravi et al, Buy me that look: An approach for recommending similar fashion products, arXiv:2008.11638v1 (Year: 2020).\*
(Continued)

*Primary Examiner* — Ping Y Hsieh
*Assistant Examiner* — Xiao Liu
(74) *Attorney, Agent, or Firm* — Finch & Maloney PLLC

(57) ABSTRACT

Techniques are provided herein for retrieving images that correspond to a target subject matter within a target context. Although useful in a number of applications, the techniques provided herein are particularly useful in contextual product association and visualization. A method is provided to apply product images to a neural network. The neural network is configured to classify the products in the images. The images are associated with a context representing the combination of classified products in the images. These techniques leverage both seller-provided images of products and user-generated content, which potentially includes hundreds or thousands of images of the same or similar products as the seller-provided images. A graphical user interface is configured to permit a user to select the context of interest in which to visualize the products.

20 Claims, 13 Drawing Sheets

(51) Int. Cl.
    *G06T 7/00*         (2017.01)
    *G06N 3/08*         (2023.01)
    *G06F 3/14*         (2006.01)
    *G06V 10/22*       (2022.01)
    *G06V 10/25*       (2022.01)
    *G06V 10/40*       (2022.01)
    *G06F 18/214*     (2023.01)
    *G06N 3/045*      (2023.01)

(56) References Cited

U.S. PATENT DOCUMENTS

| | | | | |
|---|---|---|---|---|
| 2020/0380243 | A1* | 12/2020 | Singh | G06V 40/173 |
| 2021/0065418 | A1* | 3/2021 | Han | G06T 7/73 |
| 2021/0150249 | A1* | 5/2021 | Zheng | G06F 18/22 |
| 2021/0287091 | A1* | 9/2021 | Ge | G06F 18/214 |
| 2021/0287274 | A1* | 9/2021 | Nguyen | G06N 3/04 |

OTHER PUBLICATIONS

Cheng et al, Fashion meets computer vision: a survey, arXiv:2003.13988v1 (Year: 2020).*

* cited by examiner

RETRIEVING IMAGES THAT CORRESPOND TO A TARGET SUBJECT MATTER WITHIN A TARGET CONTEXT

FIELD OF THE DISCLOSURE

This disclosure relates generally to the field of image processing, and more particularly, to techniques for retrieving images that correspond to a target subject matter within a target context.

BACKGROUND

Image-based searching (also sometimes referred to as "reverse image searching") is becoming increasingly popular, with advent of high computing power machines. For example, given a query image, an image search system can find other images that are similar to the query image. This allows a user to discover images that are related to, or similar to, the specific query image. Such image-based searching often uses neural networks that are trained to recognize objects in images and to label the images so that the images can be retrieved using a suitable search query and search engine. However, there remain a number of non-trivial issues with respect to image-based search, as will be appreciated in light of this disclosure. For example, existing image-based search techniques are not capable of retrieving images matching particular search attributes over a range of possible options, so as to fine tune search results using a structured search query over multiple data sources, because the labels generated by the neural networks do not support such structured queries. As such, there is currently no image search system that can identify and retrieve images of objects within a given desired context. For example, there is no way to request an image that depicts a model wearing a specific pair of sneakers (desired object) and gym pants rather than gym shorts (desired context). Existing image retrieval systems are not trained or otherwise designed to infer or otherwise disentangle different contextual features of a target object depicted in an image, particularly when those contextual features are multifaceted (each context feature can have one of several states) and independent of one another (the state of one context feature is independent of the state of the other context features). Therefore, complex and non-trivial issues associated with image-based search remain.

SUMMARY

Techniques are provided herein for retrieving images depicting a target object within a target context, and more particularly, for providing a user with images of a main product depicted in the context of one or more context objects, such as articles of clothing, pieces of furniture, or other combinations of objects that are often used together. The images may be collected from previous buyers of the objects that have uploaded images of those objects in combination with other objects. Once received, the images are analyzed using neural networks trained to classify both the main target object and any context objects in each of the images. More specifically, a first neural network is configured to classify multiple objects in each of the images and to generate labels for each of the identified objects. The methodology further includes associating each image with a context representing the combination of objects in the images based on the labels. The images that contain the various identified contexts can then be clustered or otherwise grouped together and be made available for retrieval via structured search queries for images depicting the object in a user-specified context by mapping the query parameters to the contextualized images containing the objects of interest. In some embodiments, a second neural network is configured to identify a common prominent feature among multiple images. The common prominent feature is a further indication that the images have similar contexts and, using the common prominent feature along with the labels generated by the first neural network, the association between the images and the context is further refined to provide highly relevant image retrieval results in response to the search query. These techniques leverage all available images including user-generated content, which potentially includes hundreds or thousands of images of the same or similar objects. A graphical user interface is configured to permit a user to select the context of interest (also referred to herein as the target context) in which to visualize the object of interest (also referred to herein as the target object).

The disclosed techniques are especially well-suited in the context of online shopping, where a webpage used for purchasing a particular article of clothing or accessory not only allows the user to purchase the article of clothing, but further allows the user to have a relatively high degree of apparel visualization based on the user's target context, which is not possible in current online shopping experiences. For instance, in one such embodiment, the website can include a user interface that a user can click on in order to request images of the target object, such as an article of clothing, being worn by models in a target context that includes one or more other objects, such as another article of clothing. It should be noted that the term "model" is used herein to simply refer to any person wearing the article of clothing or accessory and does not need to refer to a professional model. Numerous variations and embodiments will be appreciated in light of this disclosure.

Any number of non-transitory machine-readable mediums (e.g., embedded memory, on-chip memory, read only memory, random access memory, solid state drives, and any other physical storage mediums) are used to encode instructions that, when executed by one or more processors, cause an embodiment of the techniques provided herein to be carried out, thereby allowing for images of products to be associated, for subsequent retrieval, with a context based on the products identified by the neural network. Likewise, the techniques can be implemented in hardware (e.g., logic circuits such as field programmable gate array, purpose-built semiconductor, microcontroller with a number of input/output ports and embedded routines). Numerous variations and embodiments of the disclosed techniques will be appreciated in light of this disclosure.

DETAILED DESCRIPTION

Figure 1:
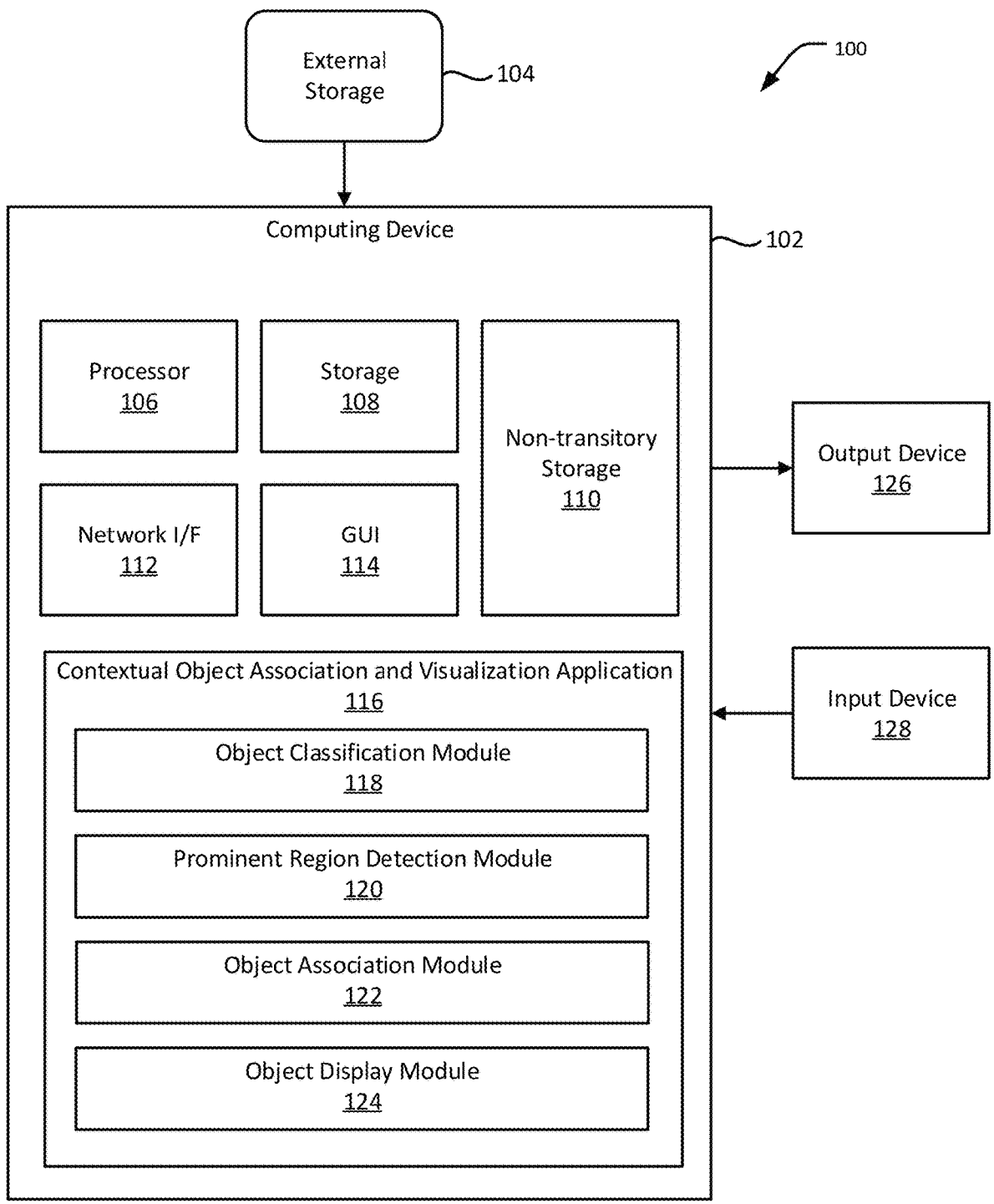
FIG. 1 illustrates an example image retrieval system for retrieving images suitable for contextual object association and visualization, in accordance with an embodiment of the present disclosure.

Techniques are provided for retrieving images that correspond to a target object and context. Although a number of applications will be appreciated, the techniques are particularly well-suited in the context of online shopping, where they can be used in associating and visualizing a product within a variety of different contexts. It is appreciated that fashion and style, whether in clothing, jewelry, or home décor, typically involve combinations of products, which depend on a particular customer's interests and desires. In an online environment, customers use various images of products to visualize the products, but current image retrieval systems do not allow a user to easily retrieve or otherwise see images depicting a desired product in different contexts before making a purchasing decision. According to an embodiment of the present disclosure, a method for processing image files includes applying a first image containing a main object (also referred to herein as a desired or target object) to a neural network configured to identify a first context object in the first image, and applying a second image containing the main object to the neural network, which is also configured to identify a second context object in the second image. The neural network identifies the first context object and the second context object by generating labels for each object. Based on the identifications, the method includes associating the first image with the first context object and the second image with the second context object using the labels to produce contextualized images. The contextualized images can then be retrieved and displayed to the user via an interface that generates a search query based on the user-selected context of interest for retrieving one or more images containing the main object and the context object. For instance, according to one such example embodiment, the user interface can construct a search query for the main product (e.g., sneakers) and the context product (e.g., gym trousers) based on the user-selected context. The search query is then executed against the contextualized images to retrieve images of the products in the desired context.

As explained above, current image retrieval systems do not allow a user to retrieve or otherwise view images depicting a desired object or a combination of objects in a user-specified context. At best, existing image retrieval techniques are limited to searching for images of a single given object or, if the images have been manually labeled, images containing combinations of objects. Such existing image retrieval systems do not have the intelligence to disentangle target context features (such as a combination of a main object and a context object) appearing in the same image. For instance, an existing image retrieval system may be able to find an image depicting a specific object (e.g., a pair of shoes), but finding an image that depicts the object in a specific context (e.g., a pair of shoes in combination with a pair of trousers) is not possible because the system has no mechanism for associating the main object with the context object. This complex problem is further exacerbated with the context features themselves are multifaceted. One example case is where the image of a main object includes several other objects appearing in a variety of different orientations and partial views. In such cases, the image retrieval system would need to understand the main object itself (e.g., a pair of shoes), one or more other objects in the image that are potentially useful for providing a context to the main object, and any prominent features of the objects in the image that could be used to further define the overall context of the objects. Even with that information, the system must further know how to associate the objects to the context and to categorize the image accordingly for retrieval via a search query. However, existing techniques do not leverage neural networks for contextualizing images containing multiple objects so that those images can be retrieved based on search criteria where the user specifies the context in which the objects are to appear. More simply stated, current image retrieval systems are incapable of retrieving images depicting a desired object in a user-specified context.

To solve this problem, an embodiment of the present disclosure provides an image retrieval system that can retrieve images depicting a desired object within a desired context. For instance, according to one example embodiment, if the user is searching for images of sneakers and wants to restrict the search results to images of those sneakers on a model wearing gym trousers, a user interface is provided to enable the user to select or otherwise retrieve any image that depicts a model wearing the sneakers and the gym trousers. This is achieved, in some examples, by applying the images to a neural network trained to recognize the objects in each image, and, based on the object recognition, aggregating or otherwise grouping the images according to a context representing certain combinations of objects. Each neural network includes one or more layers of neurons having unique sets of weights that result from training, where each weight is assigned to a pathway between neurons. The weights, and the values of the neurons, determine the output of the neural network. Note this applying and grouping can be done offline (ahead of any user request) or in real-time (responsive to user request). In any such cases, this allows the images to be retrieved by searching on context rather than limiting the search to individual objects or relying on existing labels that are manually applied to the images. Thus, with the disclosed image retrieval techniques, a user can easily search for and retrieve images of objects in a desired context. Although a number of applications will be appreciated, the techniques are particularly well-suited in the context of online shopping, where they can be used in associating and visualizing a product within a variety of different contexts. It is appreciated that fashion and style, whether in clothing, jewelry, or home décor, typically involve combinations of products, which depend on a particular customer's interests and desires. In an online environment, customers use various images of products to visualize the products, but current image retrieval systems do not allow a user to easily retrieve or otherwise see images depicting a desired product in different contexts before making a purchasing decision.

Term Definitions

As used herein, "main object" and "context object," in addition to their plain and ordinary meanings, refer to two or more objects that appear in the same image. For example, in an image of a model wearing a pair of shoes and a skirt, the main object includes the shoes and the context object includes the skirt, or vice versa. Either way, the image includes both the main object and the context object, as opposed to an image that shows one or the other. Generally, the main object and the context object are objects that are each identified by applying the image to a neural network trained to recognize and identify such objects. A main object may also be referred to herein as a desired object or a target object; likewise, a context object may also be referred to herein as a desired context object or a target context object, as will be appreciated.

As used herein, a "context," in addition to its plain and ordinary meaning, refers to a pairing or association of the main object with one or more context objects in an image that is displayed or otherwise accessible to a user, such as a customer in an online shopping environment. For example, if the main object is a pair of shoes, the context for the main object can be, for instance, the shoes paired with shorts, the shoes paired with gym pants, the shoes paired with a skirt, or the shoes paired with any other object. In a given context, each image of the main object includes at least one context object associated with the context that represents the object pairings visible in the image.

As used herein, an "image," in addition to its plain and ordinary meaning, refers to a digital image having pixel data representing colors or gray levels. In some examples, the image is displayable in a format that is visible to and recognizable by a human. The pixel data in the image is recognizable by a neural network trained to identify patterns within the image and to generate information about or with respect to the patterns, such as labels and bounding boxes that can be used for further processing of the image and/or objects in the image.

As used herein, the term "model" refers to a subject identified within an image. The subject can be, for instance, a person, an animal, or other object to which a detail or accessory can be applied. In accordance with some of the embodiments herein, the model in the image wears a particular article of clothing or accessory that a user may be interested in purchasing for him or herself. Human models are used in examples herein, but the techniques provided herein can equally be applied to other models as will be appreciated.

As used herein, the term "common prominent feature" refers to objects or other features that are predominantly visible within two or more images, as opposed to object or features that are only slightly or partially visible within any one of the images. Examples of common prominent features include where each image shows the same region of a person's body or an otherwise similar scene around the main and context objects. For instance, if the main object is a pair of shoes and the context object is a pair of pants, then some embodiments will associate all images of a person's lower body that include the shoes and the pants, since these features are predominant within each image.

As used herein, the term "one or more object classification layers" refers to one or more layers of a neural network (e.g., hidden layers, fully connected layers) that are configured during training of the neural network to identify and/or classify a product or other object present in an image. Such layers have a unique set of weights that result from training, each weight assigned to a neuron or pathway between neurons. It is these weights that characterize the network's intelligence and ability to infer the object.

As used herein, the term "one or more common prominent feature classification layers" refers to one or more layers of a neural network (e.g., hidden layers, fully connected layers) that are configured during training of the neural network to identify and/or classify a common prominent feature present in two or more images. Such layers have a unique set of weights that result from training, each weight assigned to a neuron or pathway between neurons. It is these weights that characterize the network's intelligence and ability to infer the common prominent feature.

Overview

As noted above, current image retrieval systems do not allow customers to readily retrieve images of products appearing in different desired contexts to visualize the products before making a purchasing decision. Thus, when a customer is shopping for certain products, the ability for the customer to visualize the products in a desired context would be very helpful. For instance, a customer shopping for shoes may want to get a sense of how the shoes pair with other articles of clothing from a fashion perspective. In an online environment, sellers often provide images of products that are offered for sale. These images are typically visually appealing but do not always represent the products in contexts of interest to all customers. For example, a seller-provided image of a footwear product, such as sneakers, may be shown on a model who is wearing other clothing, such as gym shorts. For customers who intend to purchase the sneakers and wear them with gym shorts, the seller-provided image is appealing. However, customers who intend to purchase the sneakers and wear them with other types of clothing, such as jeans or trousers, have a more difficult time visualizing the product pairing because no single image of both products is available from the seller. Thus, it is appreciated that an image retrieval system capable of providing customers with images where the product for sale (also referred to as the main product) is depicted in context with one or more other products (also referred to as the context products) will help customers visualize the main product in a context that more accurately represents the customer's intended use of the main product, such as wearing sneakers with jeans or trousers instead of gym shorts.

In addition to the seller-provided product images, a large number of product images are uploaded daily by other users. Such images are referred to as user-generated content (UGC). For example, customers who have purchased the product (such as sneakers) may upload images of the product being worn or used in real life situations (such as wearing the sneakers with gym shorts). Such images may be uploaded, for instance, in online product reviews or as social media, or other publicly accessible locations. Such UGC of the main products paired with one or more context products potentially enable other customers to visualize the main products in contexts that may not be available from the seller-provided images. However, there is currently no structured way for customers to easily find and view the UGC of products in different contexts. Generally, customers are only presented with seller-generated images in a given environment where UGC is not readily accessible in an organized fashion. Thus, the customer must actively seek out product images showing the product in a context of interest to the customer, which is inconvenient and time-consuming especially when the customer must search through potentially thousands of uncategorized images. Therefore, it is appreciated that improved image search techniques for contextual product association and visualization would benefit sellers and consumers alike.

To this end, techniques are provided herein for retrieving images that correspond to a target product and context. Although a number of applications will be appreciated, the techniques are particularly well-suited in the context of online shopping, where they can be used in associating and visualizing products in various contexts. These techniques leverage both seller-provided images of products and UGC, which potentially includes hundreds or thousands of images of the same or similar products as the seller-provided images. The techniques may be embodied in devices, systems, methods, or machine-readable mediums, as will be appreciated. For example, according to a first embodiment of the present disclosure, an image retrieval system is provided that is configured to apply images to a neural network configured to identify the products in the images and to associate, for subsequent retrieval, the images with a context representing the combination of products in the images. Numerous variations and embodiments of the disclosed techniques will be appreciated in light of this disclosure.

Image Retrieval System

FIG. 1 illustrates an example image retrieval system 100 for contextual object association and visualization, in accordance with an embodiment of the present disclosure. The system 100 includes a computing device 102 having at least one processor 106, one or more storage devices 108, a non-transitory storage medium 110, a network interface (I/F) 112, and a graphical user interface (GUI) 114. The GUI 114 includes or configured to interact with a display or other user output device 126, and a user input device 128.

According to some embodiments, the processor 106 of the computing device 102 is configured to execute a contextual object association and visualization application 116, which includes the following modules, each of which is described in further detail below: an object classification module 118, a prominent region detection module 120, an object association module 122, and an object display module 124. In some embodiments, the computing device 102 is configured to receive or retrieve one or more images (for example, images of one or more objects) that are stored in an external storage 104 and/or the storage device(s) 108 of the computing device 102. In some embodiments, the external storage 104 is local to the computing device 102 (such as an external hard drive) or remote to the computing device 102 (such as cloud- or network-based storage). The external storage 104 includes, for example, a stand-alone external hard drive, an external FLASH drive or memory, a networked hard drive, a server, and/or networked attached storage (NAS). Each of the modules 118, 120, 122, and 124 execute in conjunction with each other to perform a process for contextual object association and visualization using the storage device(s) 108, the external storage 104, or any combination of these.

The computing device 102 is a computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), virtual reality (VR) device or VR component (e.g., headset, hand glove, camera, treadmill, etc.) or other form of computing or telecommunications device that is capable of communication and that has sufficient processor power and memory capacity to perform the operations described in this disclosure. In some embodiments, a distributed computational system is provided including a plurality of such computing devices. Further note that the computing device 102 includes, for example, a client in a client-server environment, where at least a portion of the contextual product association and visualization application 116 is served or otherwise made accessible to the computing device 102 via a network (e.g., the Internet and a local area network that is communicatively coupled to the network interface 112).

The computing device 102 includes one or more storage devices 108 or non-transitory computer-readable mediums 110 having encoded thereon one or more computer-executable instructions or software for implementing techniques as variously described in this disclosure. The storage device(s) 108 includes a computer system memory or random access memory, such as a durable disk storage (which includes any suitable optical or magnetic durable storage device, e.g., RAM, ROM, Flash, USB drive, or other semiconductor-based storage medium), a hard drive, CD-ROM, or other computer readable mediums, for storing data and computer-readable instructions or software that implement various embodiments as taught in this disclosure. In some embodiments, the storage device(s) 108 includes other types of memory as well, or combinations thereof. The non-transitory computer-readable medium 110 includes, but is not limited to, one or more types of hardware memory, non-transitory tangible media (for example, one or more magnetic storage disks, one or more optical disks, one or more USB flash drives), and the like. The non-transitory computer-readable medium 110 included in the computing device 102 stores computer-readable and computer-executable instructions or software for implementing various embodiments (such as instructions for an operating system as well as image processing software that includes the contextual product association and visualization application 116). The computer-readable medium 110 is provided on the computing device 102 or provided separately or remotely from the computing device 102.

The computing device 102 further includes the processor 106, which is configured to execute computer-readable and computer-executable instructions or software stored in the storage device(s) 108 or the non-transitory computer-readable medium 110 and other programs for controlling system hardware. The processor 106 includes multiple cores to facilitate parallel processing or may be multiple single core processors. Any number of processor architectures are available (e.g., central processing unit and co-processor, graphics processor, digital signal processor). In some embodiments, virtualization is employed in the computing device 102 so that infrastructure and resources in the computing device 102 are shared dynamically. For example, a virtual machine is provided to handle a process running on multiple processors so that the process appears to be using only one computing resource rather than multiple computing resources. Potentially, multiple virtual machines are also used with one processor. The network interface 112 includes any appropriate network chip or chipset which allows for wired or wireless connection between the computing device 102 and a communication network (such as a local area network) and other computing devices and resources.

A user interacts with the computing device 102 through the output device 126, which includes a display, screen, or monitor for displaying one or more user interfaces or images, including images of products or other subjects, as provided in accordance with some embodiments. The user further interacts with the computing device 102 through the input device 128 to receive input from the user via, for example, a keyboard, a joystick, a game controller, a pointing device (e.g., a mouse, a user's finger interfacing directly with a touch-sensitive display device, etc.), or any suitable user interface, including an augmented reality (AR) headset. The computing device 102 may include any other suitable conventional input/output (I/O) peripherals. In some embodiments, the computing device 102 includes or is operatively coupled to various suitable devices for performing one or more of the aspects as variously described in this disclosure.

The computing device 102 runs any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 102 and performing the operations described in this disclosure. In an embodiment, the operating system is run on one or more cloud machine instances.

In other embodiments, the functional components/modules are implemented with hardware, such as gate level logic (e.g., FPGA) or a purpose-built semiconductor (e.g., ASIC). Still other embodiments are implemented with a microcontroller having several input/output ports for receiving and outputting data, and several embedded routines for carrying out the functionality described in this disclosure. In a more general sense, any suitable combination of hardware, software, and firmware are used, as will be apparent.

As will be appreciated in light of this disclosure, the various modules and components of the system, such as the contextual object association and visualization application 116, the object classification module 118, the prominent region detection module 120, the object association module 122, the object display module 124, the GUI 114, or any combination of these, may be implemented in software, such as a set of instructions (e.g., HTML, XML, C, C++, object-oriented C, JavaScript®, Java®, BASIC, etc.) encoded on any machine-readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, are performed by one or more suitable processors in any number of configurations and arrangements, and that the depicted embodiments are not intended to be limiting. Various components of this example embodiment, including the computing device 102, are integrated into, for example, one or more desktop or laptop computers, workstations, tablets, smart phones, game consoles, virtual reality (VR) devices, set-top boxes, or other such computing devices. Other componentry and modules typical of a computing system will be apparent.

Example Use Cases

Figure 2:
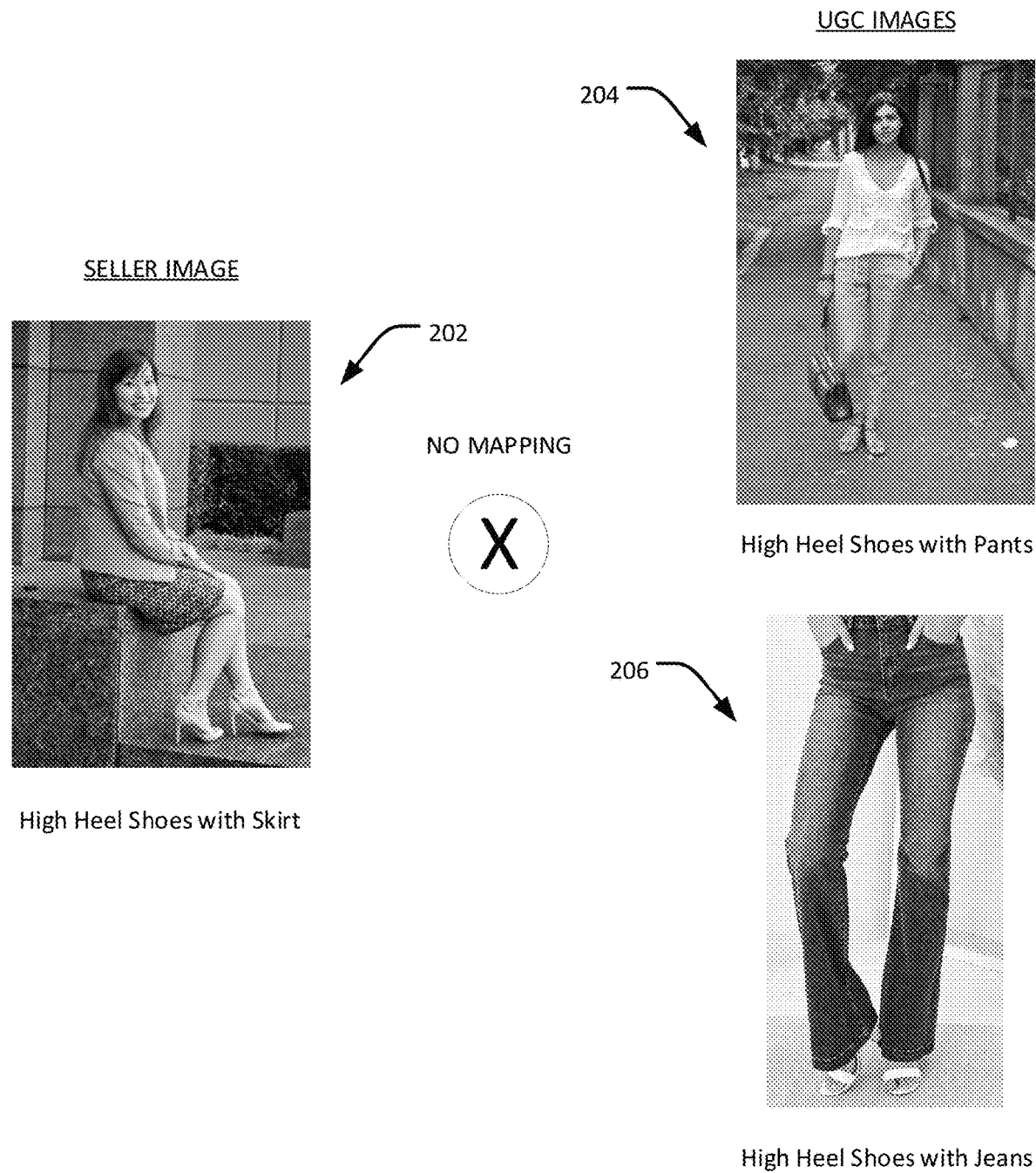
FIGS. 2-3 each show example contextual object association and visualization use case scenarios, in accordance with an embodiment of the present disclosure.
Figure 3:
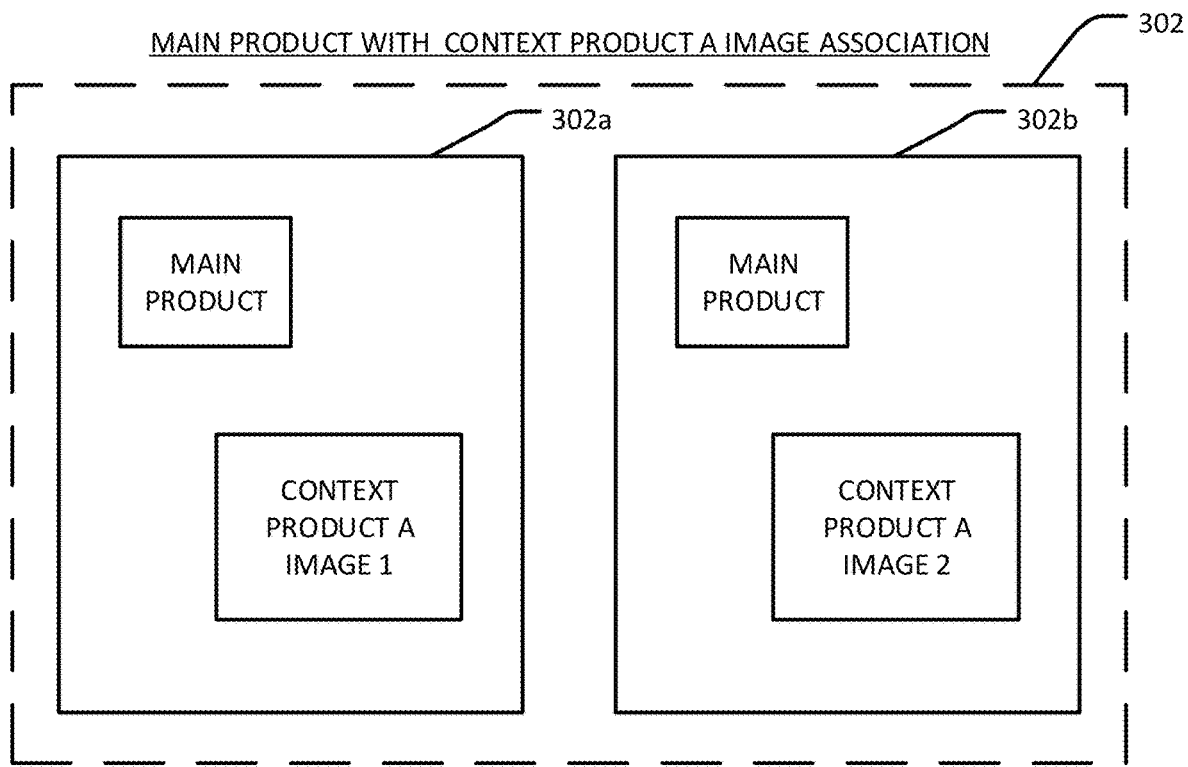
Figure 3:
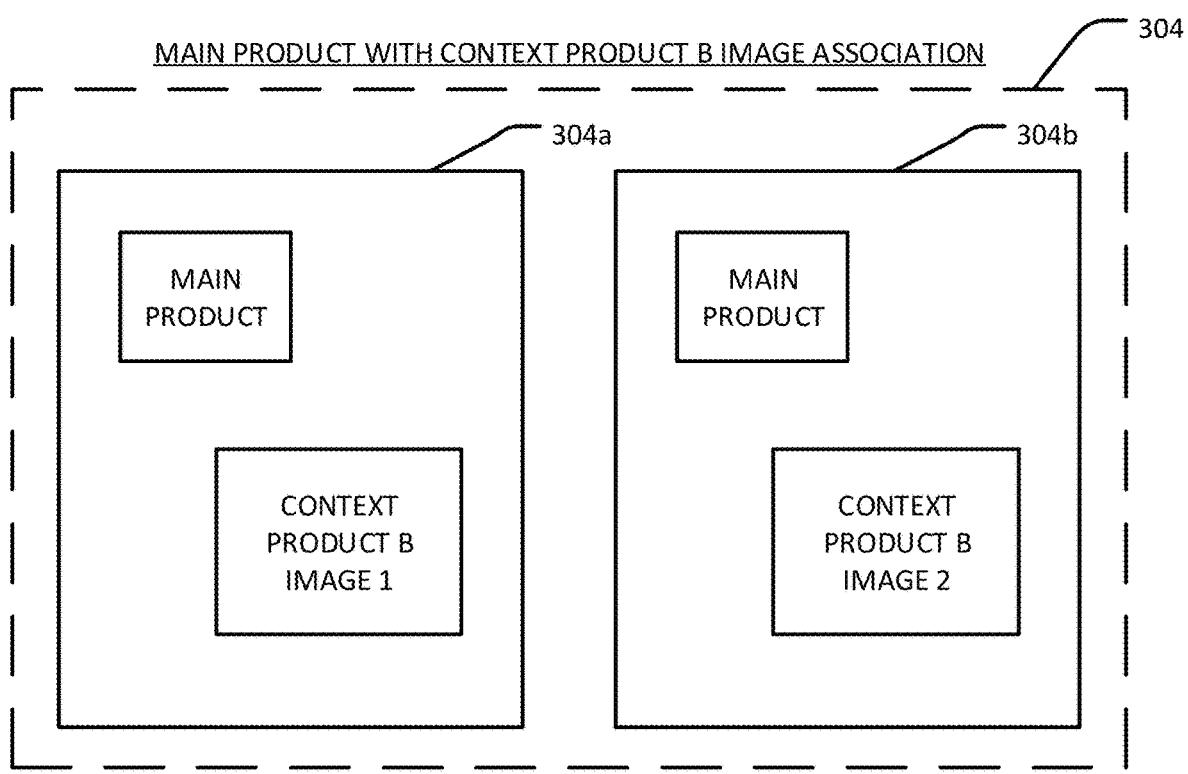

FIGS. 2-3 show an example contextual product association and visualization use case scenario, in accordance with an embodiment of the present disclosure. FIG. 2 shows three different images 202, 204, 206 of a main product or object. In this example, the main product is a pair of high heel shoes, although it will be understood that the main product could be any product being offered or sold in an online environment. The images include one or more seller-provided images 202 and one or more UGC images 204, 206. Each of the images 202, 204, 206 show the main product in context with one or more context products, although it will be understood that in some examples the main product is shown without any context (that is, the image may show only the main product or the main product in a scene that does not provide context with at least one context product). In this example, the context products are different in each image: in the seller image 202, the context product is a skirt; in the UGC image 204, the context product is a pair of pants; and in the UGC image 206, the context product is a pair of jeans. As a result, the images 202, 204, 206 each provide a visualization of the main product in a different context: shoes with a skirt, shoes with pants, and shoes with jeans. These visualizations are useful because they allow a customer to see how the main product looks when used with one of the various context products. Such visualizations help customers make an informed purchasing decision that is likely to reduce customer dissatisfaction with the product.

However, there are no existing techniques that make it easy for customers to locate and view the seller provided and/or UGC images for the main product with the context product of interest to the customer, such as the images 202, 204, and 206 shown in FIG. 2. Even if the images 202, 204, 206 are accessible to the customer, there is no existing mechanism for quickly locating and displaying some of these images because no mapping exists between the images 202, 204, 206, or between the main product, the context product(s), and the images 202, 204, 206. For example, if the customer is interested in purchasing the shoes (the main product), the website may only display the seller provided image 202 with the skirt (the context product). In many cases, only the seller provided images are readily available to the customer, such as images shown on a product page of a given website. While other seller images or UGC images may be available either within the website (such as in product reviews) or from other sources (such as social media or independent UGC platforms, such as those that allow posting of, and public access to, images and videos), there is no easy way for the customer to locate and view these images. Thus, if the customer wishes to view the shoes with a different context product, such as the pants or the jeans, the customer, the customer has to visually scan the available images to find the ones containing the context product of interest. This is potentially time-consuming and inefficient, and it increases the chance that the customer may not locate the images of interest. To this end, embodiments of the present disclosure provide techniques for associating images of products with different contexts. These contextually associated images can then be easily retrieved and viewed by customers in a variety of contexts where the main product is paired with one or more context products.

FIG. 3 shows an example of contextual product association and visualization, in accordance with an embodiment of the present disclosure. A first set of images 302 includes an image 302a of the main product with context product A image 1, and an image 302b of the main product with context product A image 2. In this manner, the first set of images 302 represents an association between the main product and context product A, where each image in the first set of images 302 includes the main product and the context product A. A second set of images 304 includes an image 304a of the main product with context product B image 1, and an image 304b of the main product with the context product B image 2. In this manner, the second set of images 304 represents an association between the main product and context product B, where each image in the second set of images 304 includes the main product and the context product B. The associations within each set of images allows the images to be easily searched and retrieved using, for example, search terms and filters based on product names and/or contexts (named pairings or groupings of products within each image).

It will be understood that the first set of images 302 and the second set of images 304 each contain any number of different images each containing the main product and the context product A or B, respectively. Furthermore, any number of sets of images include images of the main product with any number of different context products. For example, the main product is a pair of high heel shoes, the context product A is a pair of pants, and the context product B is a pair of jeans, such as shown in FIG. 2. Additional sets of images include, for example, images of the main product (such as the shoes) with other context products (such as a skirt, gym pants, capris, shorts, leggings, etc.). In the example of FIGS. 2 and 3, the image 204 is included in the first set of images 302, along with any additional images of the shoes with the pants, and the image 206 is included in the second set of images 304, along with any additional images of the shoes with the jeans.

Example Graphical User Interface

Figure 4A:
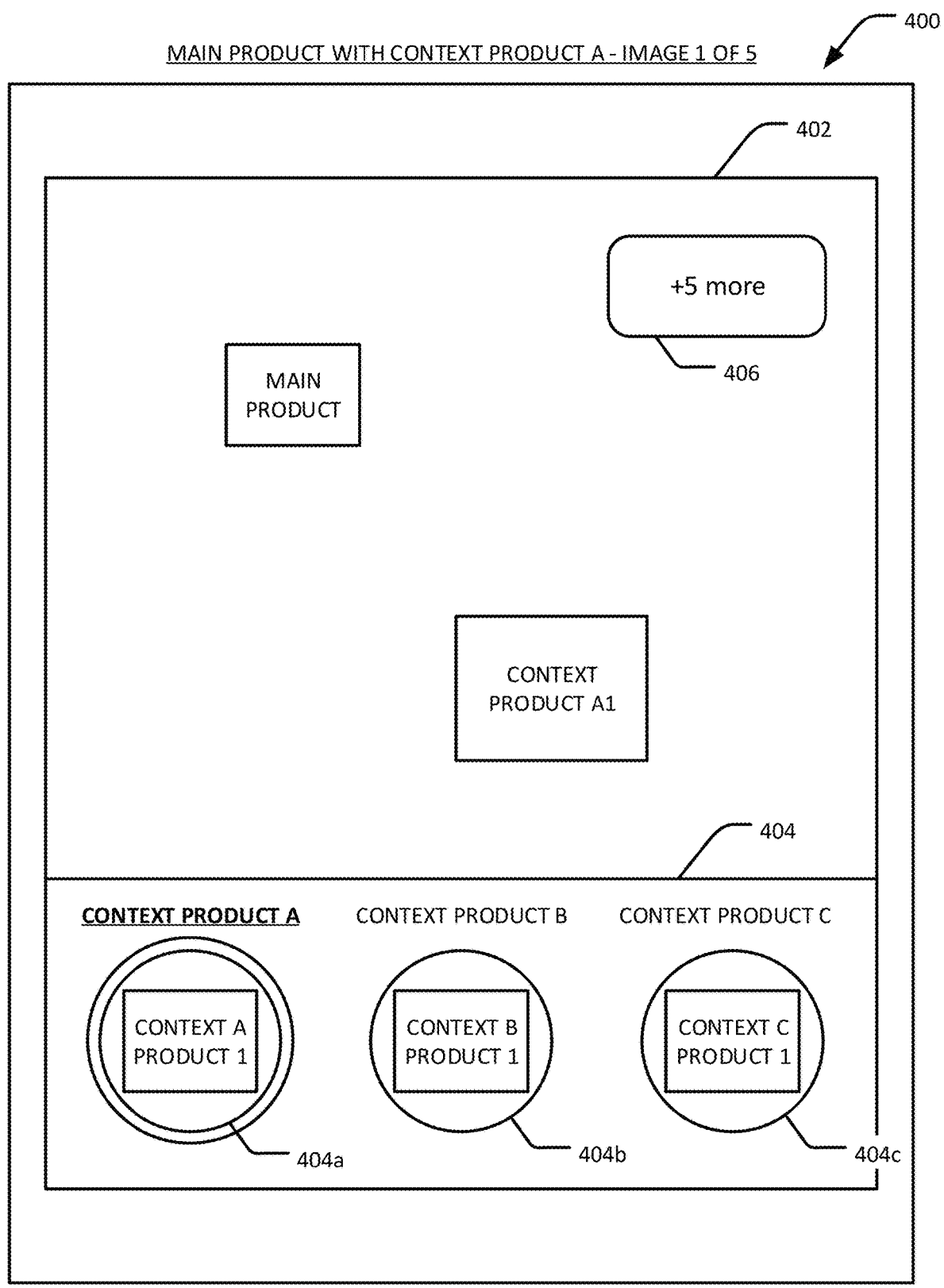
FIGS. 4A and 4B show an example graphical user interface (GUI) of an image retrieval system configured to retrieve images suitable for contextual object association and visualization, in accordance with an embodiment of the present disclosure.
Figure 4B:
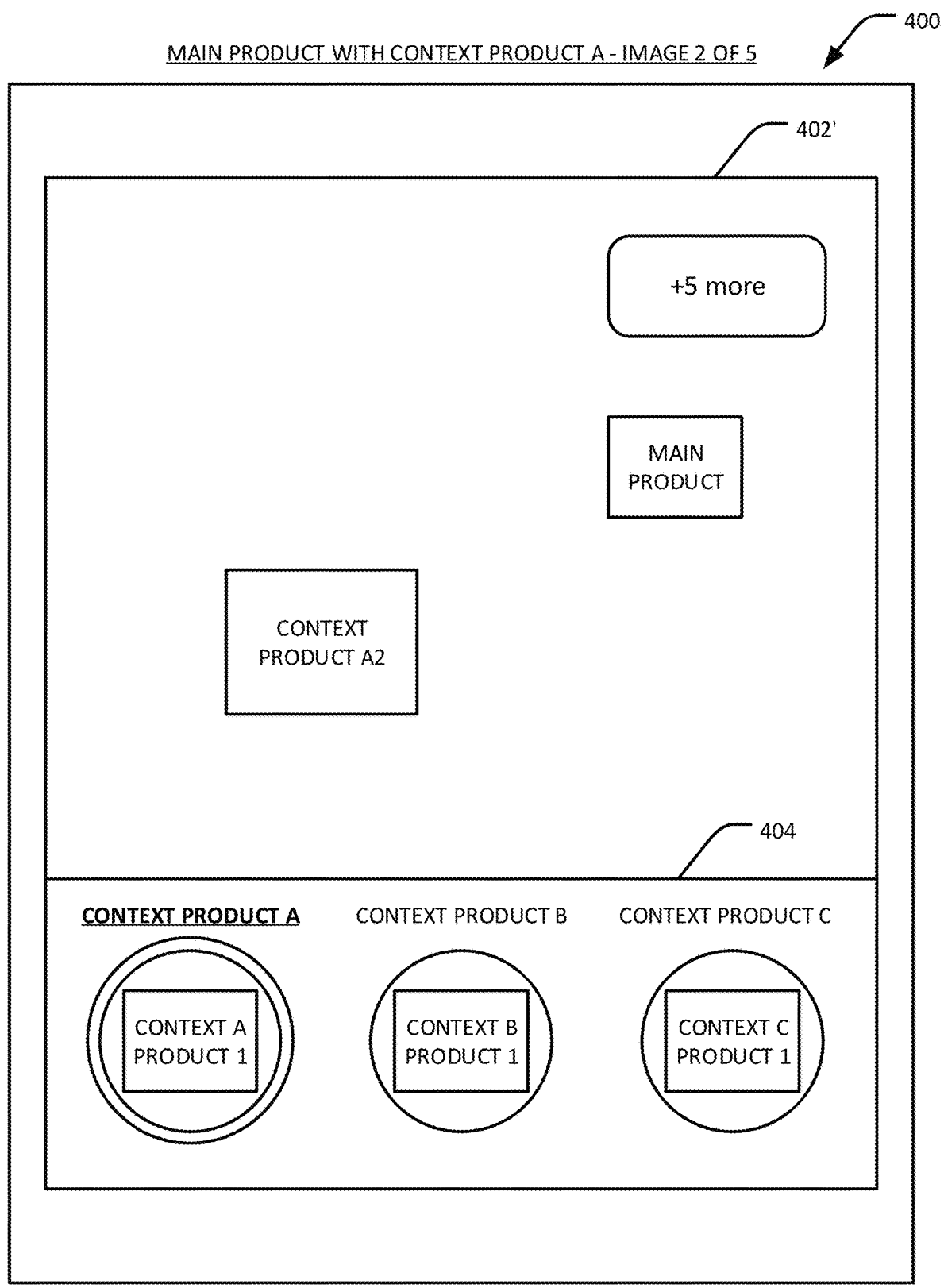

FIGS. 4A and 4B show an example graphical user interface (GUI) 400 for contextual product association and visualization, in accordance with an embodiment of the present disclosure. In FIG. 4A, the GUI 400 includes an image 402 of a main product 404, a context product A1, and a user selection region 404. Within the user selection region 404 are one or more context product icons 404a, 404b, 404c. Each of the content product icons 404a, 404b, 404c represent different context products (such as context product A, context product B, context product C, etc.) that are paired or otherwise associated with the main product in the image 402. In some embodiments, the content product icons 404a, 404b, 404c include thumbnail images of a representative context product. For example, if context product A is a skirt and the main product is a pair of high heel shoes, then the context product icon 404a for context product A includes a thumbnail image of a representative skirt. Similarly, if context product B is a pair of pants and the main product is a pair of high heel shoes, then the context product icon 404b for context product B includes a thumbnail image of a representative pair of pants. Further to this example, if context product C is a pair of jeans and the main product is a pair of high heel shoes, then the context product icon 404c for context product C includes a thumbnail image of a representative pair of jeans.

If the user selects the context product icon 404a for context product A, then the image 402 includes the main product (e.g., a pair of high heel shoes) and the context product A1 (e.g., a skirt). If more than one image is available for the main product and the context product A1, then a reference icon 406 is displayed in the GUI 400. The reference icon 406 indicates that multiple images are available to view for the user-selected context. The reference icon 406 is configured to be selected by the user to display one or more of the images. For example, FIG. 4B shows the GUI 400 with a different image 402' of the main product and a context product A2. The image 402', for example, shows the respective context products A1 and A2 in a different scene, on a model with a different pose, or with different colors or styles of the respective products, providing a variety of visualizations of the main product and the context product A for the user to view. Likewise, if the user selects the context product icon 404b for context product B, then the image 402 includes the main product (e.g., a pair of high heel shoes) and the context product B (e.g., a pair of pants). If more than one image is available for the main product and the context product B, then the reference icon 406 is displayed in the GUI 400, as described above. Further to this example, if the user selects the context product icon 404c for context product C, then the image 402 includes the main product (e.g., a pair of high heel shoes) and the context product C (e.g., a pair of jeans). If more than one image is available for the main product and the context product C, then the reference icon 406 is displayed in the GUI 400, as described above. It will be understood that any number of context product icons 404a, 404b, 404c are displayed, depending on how many different product pairing images are available for each respective context.

Figure 5:
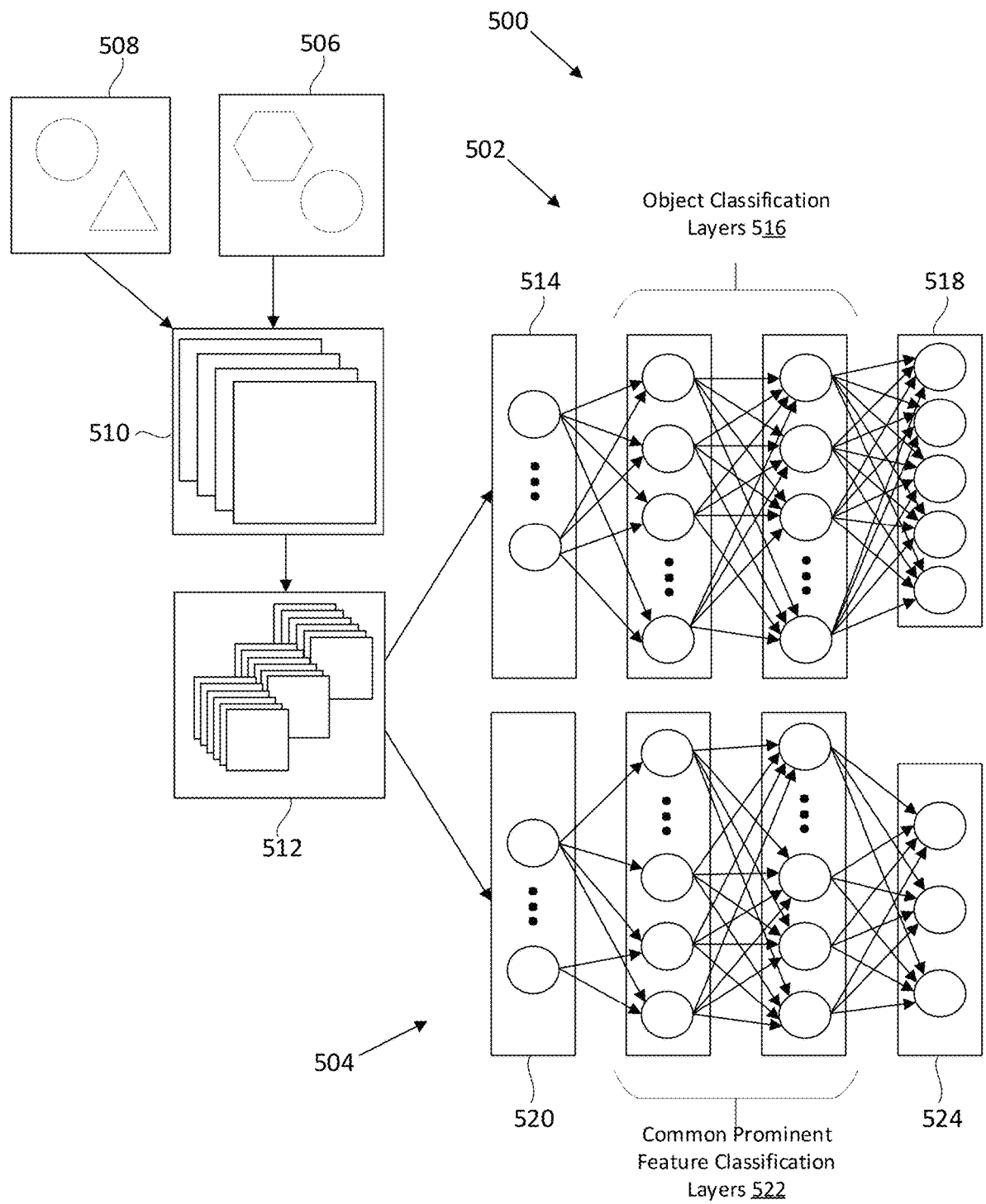
FIG. 5 illustrates an example image feature detection system, according to an embodiment of the present disclosure.

FIG. 5 illustrates an example image feature detection system 500, according to an embodiment. Specifically, image feature detection system 500 uses a first neural network 502 to classify a first context object depicted within a first input image 506 and to classify a second context object depicted within a second input image 508, and a second neural network 504 to classify a common prominent feature in both the first and second images 506, 508. In some such embodiments, image feature detection system 300 is a component of object classification module 118 and/or the prominent region detection module 120 of FIG. 1.

The first image 506 represents any received image of a main object (represented by a circle) and a first context object (represented by a hexagon), and the second image 508 represents any received image of the main object and a second context object (represented by a triangle), according to some embodiments. The images 506, 508 may be, for example, provided by a seller, or user generated content such as an image provided by a previous purchaser of the main object. In the latter case, for instance, first and/or second input images 506, 508 may be uploaded in a comment section of a webpage on an online website dedicated to advertising that particular object or product. In some other examples, input images 506, 508 may be uploaded via a specific request provided by the website for users to upload their own images of the clothing product. Any number of crowd-sourced or user-generated images can be used.

One or more filters are applied to input images 506, 508 by one or more convolutional layers 510, according to some embodiments. More specifically, one or more convolutional layers 510 break down input images 506, 508 into various filtered feature maps that identify locations and relative strengths of detected features in the image.

According to some embodiments, pooling layers 512 are used to further down sample the detected features from the feature maps generated by the one or more convolutional layers 508. In essence, pooling layers 512 operate on the individual feature maps to generate smaller pooled feature maps. The pooled feature maps summarize the feature data from the feature maps. According to some embodiments, the resulting pooled feature maps are more robust to any changes in position of the salient features from input image 506, 508.

Once the feature maps or pooled feature maps have been generated from the input images 506, 508, the feature map data is fed as input to the first neural network 502 and the second neural network 504. The first neural network 502 includes an input layer 514, one or more object classification layers 516, and an output layer 518. The second neural network 504 similarly includes an input layer 520, one or more common prominent feature classification layers 522, and an output layer 524. Note in other embodiments that the first neural network 502 may include its own dedicated convolutional layers 510 and the pooling layers 512, as may the second neural network 504. In any such cases, each of the layers of the first neural network 502 and the second neural network 504 include neurons that represent mathematical functions and/or weights applied to data received as input to the neuron. The output of a neuron of one layer is received by each of the neurons in the proceeding layer. Accordingly, the input layer 514 of the first neural network 502 and the input layer 520 of the second neural network 522 can include any number of neurons that receive the image feature data from the pooled feature maps.

According to some embodiments, the object classification layers 516 are configured during training of the first neural network 502 to identify the common prominent feature of the image based on the object features encapsulated in the pooled feature maps. The number of object classification layers 516, the number of neurons in each of the layers, and the function performed by each neuron are established during supervised training as first neural network 502 learns how to identify different pre-determined objects based on the image features of the object. Accordingly, the characteristics (e.g., number of layers, number of neurons in a given layer, etc.) of objects classification layers 516 can be different depending on various training factors. According to some embodiments, the output layer 518 includes a number of neurons equal to the number of possible object types.

According to some embodiments, common prominent feature classification layers 522 are configured during training of the second neural network 504 to identify the common prominent feature of the object based on the object features encapsulated in the pooled feature maps. The number of common prominent classification layers 522, the number of neurons in each of the layers, and the function performed by each neuron are established during supervised training as the second neural network 504 learns how to identify different pre-determined common prominent features based on the image features of the object. Accordingly, the characteristics (e.g., number of layers, number of neurons in a given layer, etc.) of the common prominent feature classification layers 522 can be different depending on various training factors. According to some embodiments, the output layer 524 includes a number of neurons equal to the number of possible predetermined common prominent features.

Example Methods for Contextual Product Association and Visualization

Figure 6:
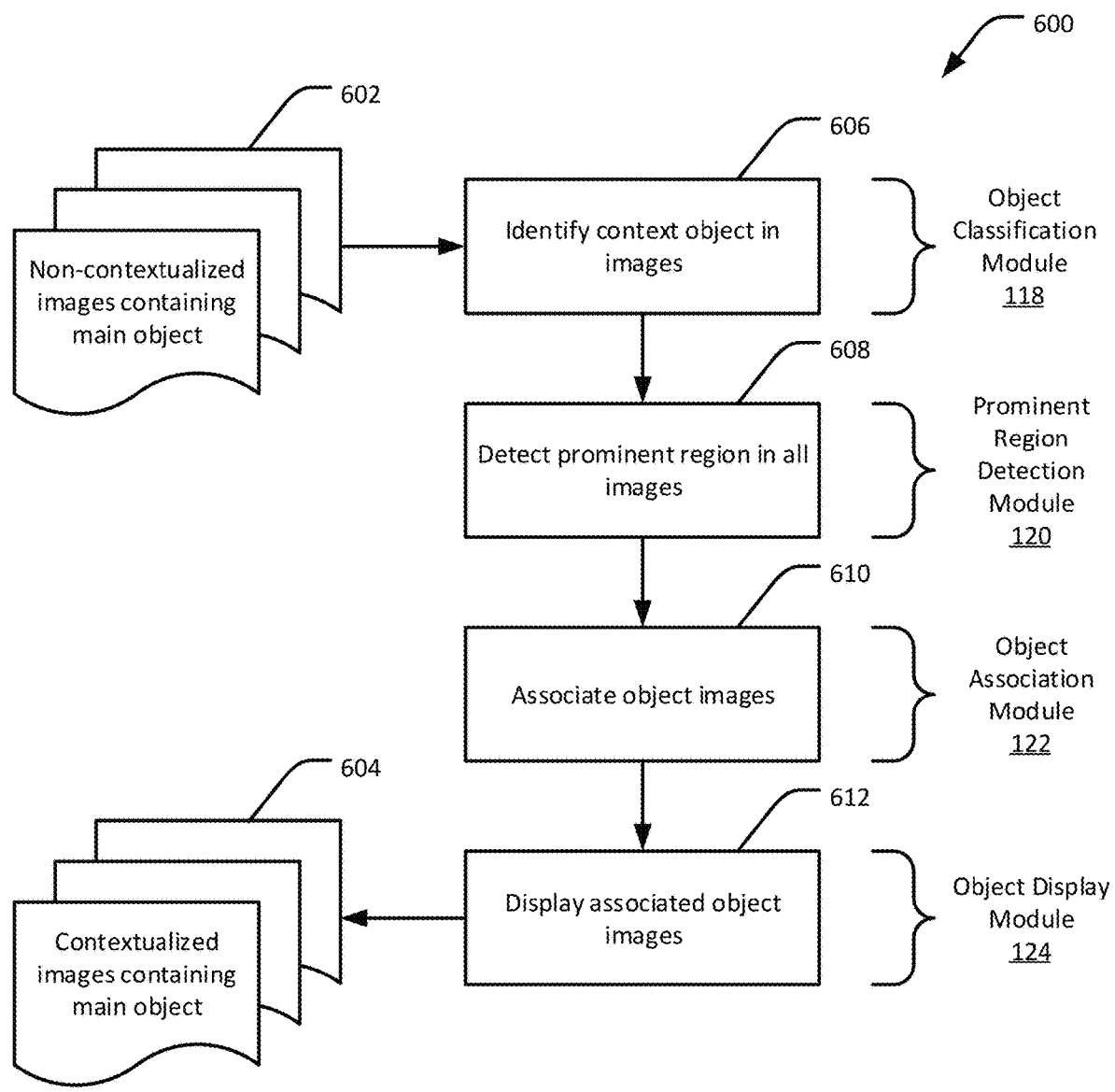
FIG. 6 is a flow diagram of an example image retrieval method for retrieving images suitable for contextual object association and visualization, in accordance with an embodiment of the present disclosure.

FIG. 6 is a flow diagram of an example method 600 for contextual object association and visualization, in accordance with an embodiment of the present disclosure. The method 600 is implemented, for example, in the system 100 of FIG. 1. The method 600 takes as an input a set of one or more non-contextualized images 602 each containing a main object. In addition to the main object, each of the non-contextualized images 602 includes one or more context objects, although it will be understood that such context objects are not necessarily present in every image. For example, some of the non-contextualized images 602 include only the main object with no context. The method 600 produces as an output a set of one or more contextualized images 604 each containing the main object and at least one context object. In some examples, the contextualized images 604 are the same as the non-contextualized images 602, although any non-contextualized images 602 that do not include at least one context object are not included in the contextualized images 604. Each of the contextualized images 604 include one or more associations with the one or more context objects in each image. The associations are used to retrieve and display the images 604 to the user via a GUI, such as described with respect to FIGS. 4A-B.

The method 600 includes identifying 606, by the object identification module, one or more context objects in a first and second image of the set of non-contextualized images 602. As described in further detail below with respect to FIG. 6, the identifying 606 is performed by applying each of the images to a first neural network pre-trained and configured to identify objects in the images and to generate labels corresponding to each object. For example, labels are generated for the main object and for each context object identified in each of the images. The labels are then used to associate the main object to the context object(s) in the respective image.

The method 600 further includes detecting 608, by the prominent region detection module, a prominent region in each of the images of the set of non-contextualized images 602. As described in further detail below with respect to FIG. 7, the detecting 608 is performed by applying each of the images to a second neural network pre-trained and configured to identify prominent regions of the images based on one or more objects in the image. For example, if the images include the legs and feet of a fashion model (or models), the second neural network identifies the prominent region as the lower region of the body. Similarly, if the images include the head and torso of the fashion model (or models), the second neural network identifies the prominent region as the upper region of the body. It will be understood that the second neural network is pre-trained and configured to identify any type of prominent region based on portions of human bodies or other objects in a scene, such as furniture, drapery, dinnerware, art objects, doors, windows, floors, plants, and/or appliances. If no prominent region is detected in a given image, or if it is desired to process all images regardless of the prominent region, then the image is discarded, and the method 600 proceeds as follows.

The method 600 further includes associating 610, by the object association module, images based on labels for the identified main object and context object(s), and the detected prominent regions. Images that do not have the same prominent region are excluded from the association because the images do not have comparable scenes. For example, among images where the prominent region is the lower body, and where the main object is a pair of shoes and the context object is a pair of pants, images of the upper body would likely not adequately represent the main object and the context object. Thus, such upper body images are excluded from an association with the main object and the context object. However, images that have the same prominent region (e.g., the lower body in the example where the main object is a pair of shoes and the context object is a pair of pants) are associated with those objects. The associated images of the main object and the context object(s) are collectively referred to as the set of contextualized images 604. Any number of associations occur depending on how many context products are in each image. For example, if an image of a main object (such as a shirt) also includes two or more context object (such as a jacket and a hat), then the image of the main object is associated with each of the context object.

The method 600 further includes displaying 612, by the object display module, the associated images via a GUI, such as described with respect to FIGS. 4A-B. For example, if the images include a main object, a context object A, and a context object B, then the displaying 612 includes any or all of the contextualized images of the main object and the context object A in response to a user selection of the context object A, or any or all of the images of the main object and the context object B in response to a user selection of the context object B. In this manner, the user can select which of the context object in which to view the main object in context with the respective context object, making it easy to visualize the main object in the context of interest to the user. Such contextualizing is important because it allows the user to view images of the main object in the same context as the user intends to use the main object, for example, a pair of earrings (the main object that the user is considering purchasing) paired with different types of clothing, such as a dress, a blazer, a tank top, a T-shirt, or a casual top and jacket. Furthermore, such contextualizing permits the UGC images of the main object to supplement seller images of the main object in a structured manner to provide the user with easy interactive access to a wider range of contexts in which to visualize the main object. Moreover, this solution does not require the user to manually scroll or search through the set of non-contextualized images 602 to find the images with the context of interest.

Figure 7:
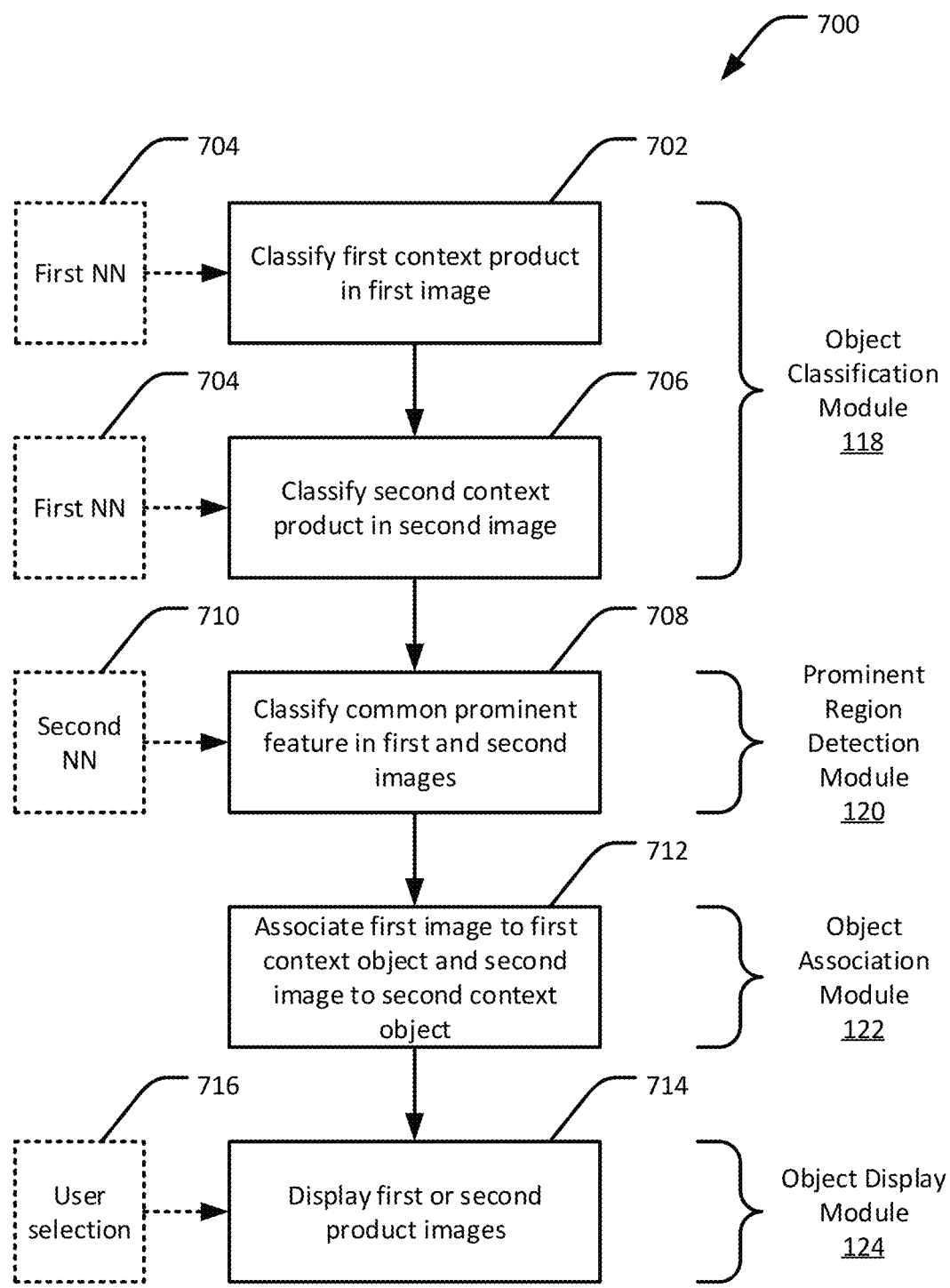
FIG. 7 is a flow diagram of an alternative example image retrieval method for retrieving images suitable for contextual object association and visualization, in accordance with an embodiment of the present disclosure.

FIG. 7 is a flow diagram of another example method 700 for contextual object association and visualization, in accordance with an embodiment of the present disclosure. The method 700 is implemented, for example, in the system 100 of FIG. 1. The method 700 includes applying 702, by the product identification module, a first image containing a main object to a first neural network 704 configured to identify a first context object in the first image. The first neural network 704 (such as a convolutional neural network or CNN) is pre-trained and configured to identify the first context object in the first image and to generate a label corresponding to the first context object. An example of the first neural network 704 is described in further detail with respect to FIG. 11. In some examples, the first image includes a label corresponding to the main object, such that the labels of the main object and the context object are associated. However, if the first image does not include a label corresponding to the main object, the first neural network is configured to identify the main object in the first image and generate the labels corresponding to the main object and the context object. It will be understood that the first neural network is further configured to identify any number of objects in the first image. In this manner, a label is obtained for each product in the first image, including the main object and all context object. Thus, the main object is associated with any of the context object on a per image basis.

The method 700 further includes applying 706, by the object identification module, a second image containing the main object to the first neural network configured to identify a second context object in the second image. The applying 706 of further images is repeated for any number of additional images to identify any number of context objects in the images.

The method 700 further includes applying 708, by the prominent region detection module, the first image and the second image (and any other images applied to the first neural network 704) to a second neural network 710 to identify a common prominent feature in both the first image and the second image (and any other images). The second neural network 710 is pre-trained and configured to identify prominent regions of the images based on one or more objects in the image. For example, if the images include the legs and feet of a fashion model (or models), the second neural network identifies the common prominent region as the lower region of the body. Similarly, if the images include the head and torso of the fashion model (or models), the second neural network identifies the common prominent region as the upper region of the body. It will be understood that the second neural network is pre-trained and configured to identify any type of common prominent region based on portions of human bodies or other objects in a scene, such as furniture, drapery, dinnerware, art objects, doors, windows, floors, plants, and/or appliances.

The method 700 further includes associating 712, by the product association module and responsive to identifying the common prominent feature, the first image with the first context product and the second image with the second context product. The first image and the second image are associated where each image has the same labels for the main object and the context object (for example, where the first and second images both include labels for a pair of shoes and a skirt).

In some embodiments, the method 700 further includes causing 714, by the object display module, the first image to be displayed on a display device in response to a user selection 716 of the first context object, and the second image to be displayed on the display device in response to a user selection 716 of the second context object. The user selection 716 is received via a GUI such as described with respect to FIGS. 4A-B, where the user selects the context object of interest within the user selection region 404 of the GUI 400.

Figure 8:
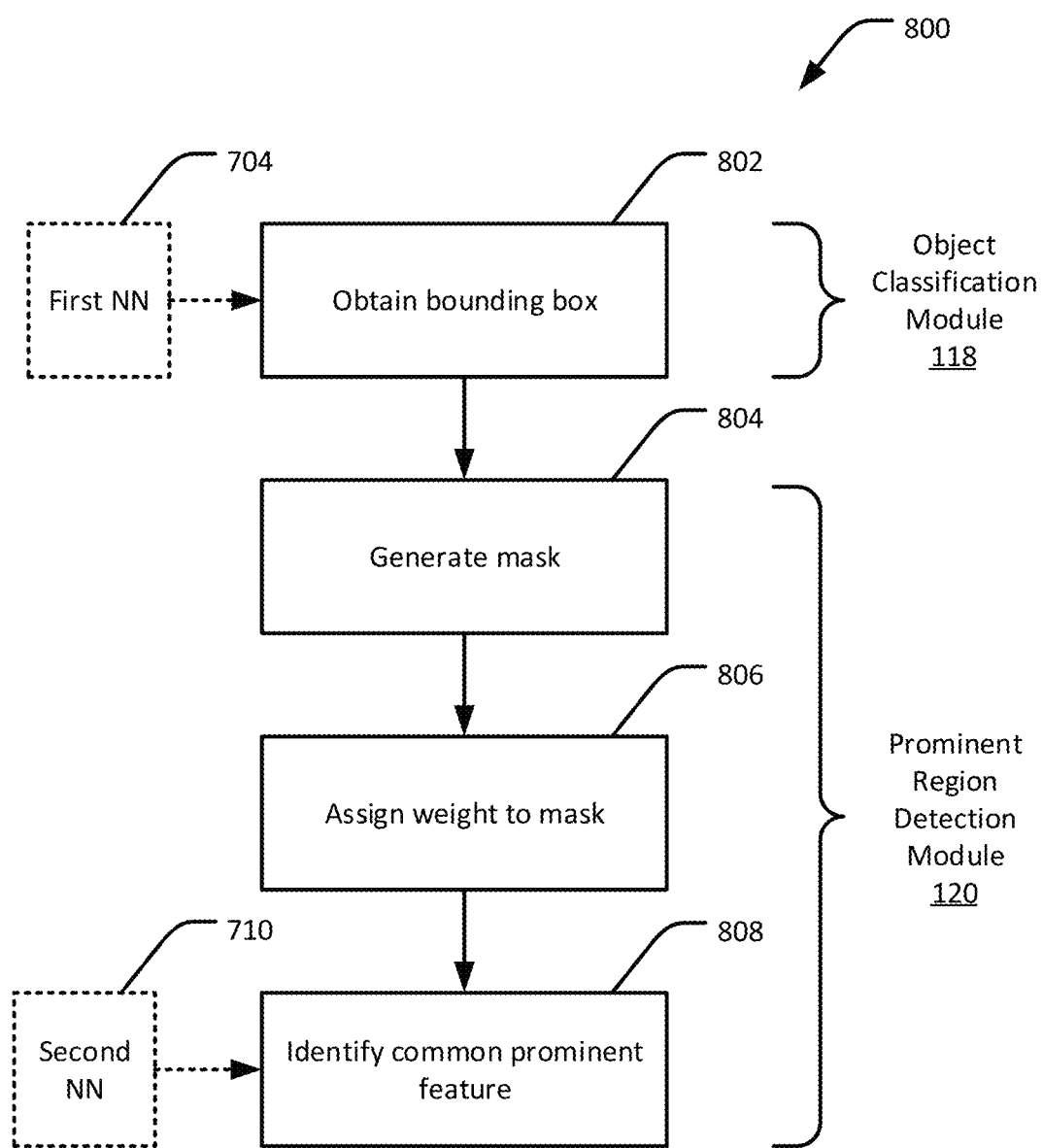
FIG. 8 is a flow diagram of an example sub-process of the method of FIG. 6, for identifying one or more objects in an image and identifying a common prominent feature among multiple images using a neural network, in accordance with an embodiment of the present disclosure.

FIG. 8 is a flow diagram of an example method 800 for identifying one or more object in an image and identifying a common prominent feature among multiple images, in accordance with an embodiment of the present disclosure. The method 800 is implemented, for example, in the system 100 of FIG. 1. As noted above, in some embodiments a first image containing a main object is applied to a first neural network 704 to identify a first context object in the first image, and a second image containing the same main object is applied to the first neural network 704 to identify a second context object in the second image. In some examples, the first context object is the same as the second context object, such as in an example where both the first and second images contain the same main object (e.g., shoes) and the same context object (e.g., pants), although it will be understood that the first image is not necessarily the same as the second image. For instance, the first and second images may have different scenes, poses, or colors even though the object in the images are the same, as identified by the first neural network 704. In the case where the first and second context object are the same, the first and second images are associated together in the same bucket or group of images and presented to the user via the GUI. To improve the quality of these associations, some embodiments identify common prominent features in each of the images. Examples of common prominent features include where each image shows the same region of a person's body or an otherwise similar scene around the main and context objects by visualizing the objects in similar contexts so that the images are more easily comparable. For instance, if the main object is a pair of shoes and the context object is a pair of pants, then some embodiments will associate all images of a person's lower body that include the shoes and the pants, since the lower body is the region where these products are commonly showcased in each of the images displayed to the user. A reason for this is because it is less helpful to the user if the prominent region in one image is the upper body and the prominent region in another image is the lower body, since the shoes in the former would be more difficult to visualize in comparison with the latter.

Figure 9:
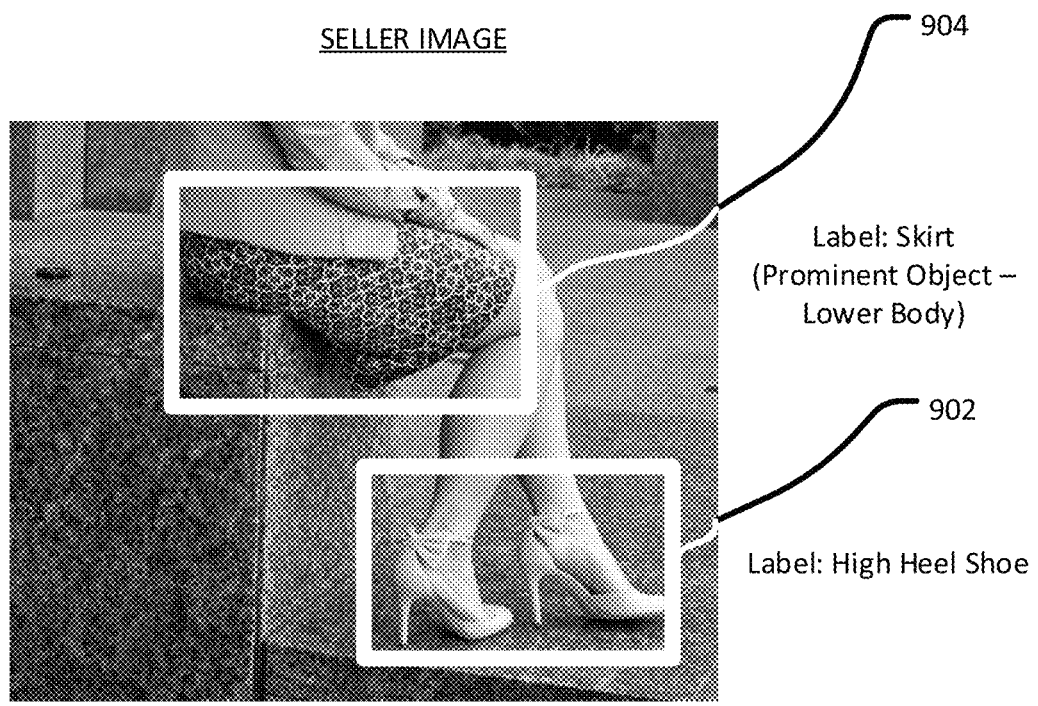
FIG. 9 is a graphical representation of bounding boxes and labels generated by applying an image to a neural network, in accordance with embodiments of the present disclosure.

The method 800 includes obtaining 802, by the product identification module, a bounding box from the first neural network 804 when the first and second images applied to the first neural network. The bounding box surrounds each product in each of the images. For example, one bounding box 902 surrounds the main object in the first image and another bounding box 904 surrounds the first context object in the first image, such as shown in FIG. 9. The bounding boxes generated by the first neural network 704 are used to isolate portions of the first image for further processing, as described below. Note that the first neural network 704 is configured to generate bounding boxes for any number of images, including the first and second images.

The method 800 further includes generating 804, by the prominent region module, a mask corresponding to the first context product within the bounding box. The mask represents a region of the respective image in which the context object (or any salient/prominent object) appears within the bounding box. For example, the mask includes a set of pixels corresponding to the image of the object. The method 800 further includes assigning 806, by the prominent region module, a first weight to the mask and identifying 808, by the prominent region module and from the second neural network 710, the common prominent feature based on the mask and the first weight. For example, a CNN model is trained to have different body parts as inputs and to generate labels representing the respective body parts from an input image, such as upper body and lower body. Using this, the prominent body part visible in the image is identified using the second neural network 710, along with the percentage of area covered by the main or context object showcased on the body. In some embodiments, a second weight is assigned to the closer portions (e.g., lower or upper) portion of the body to the main object. For example, a pair of pants is closer to a pair of shoes as compared to a T-shirt, therefore more weight is given to the lower body if the shoes are the main object and the pants and T-shirt are the context objects. In such embodiments, the common prominent feature is identified 808 based on the first weight and the second weight (e.g., a combination of the first weight and the second weight). The common prominent feature is used to determine which portion of the images are most relevant and prominent to contextualize the context objects with the main object, such as described with respect to the methods 600 and 700 of FIGS. 6 and 7.

Figure 10:
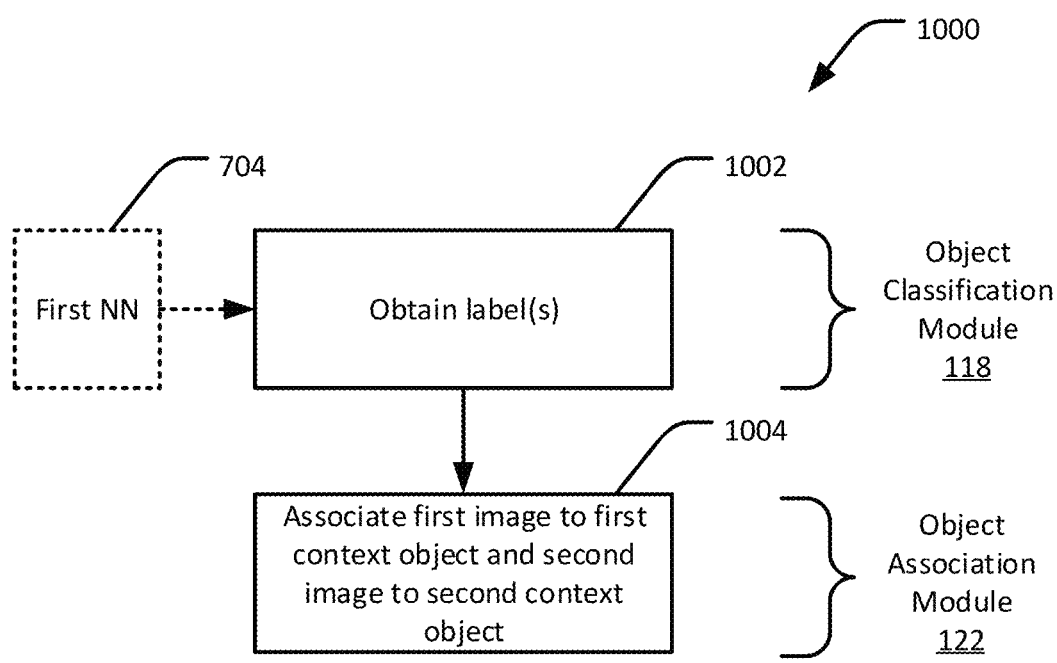
FIG. 10 is a flow diagram of an example sub-process of the method of FIG. 6 for identifying one or more objects in an image and associating multiple images using a neural network, in accordance with an embodiment of the present disclosure.

FIG. 10 is a flow diagram of an example method 1000 for identifying one or more objects in an image and associating the objects among multiple images, in accordance with an embodiment of the present disclosure. The method 1000 is implemented, for example, in the system 100 of FIG. 1. As noted above, in some embodiments a first image containing a main object is applied to a first neural network 704 to identify a first context object in the first image, and a second image containing the same main object is applied to the first neural network 604 to identify a second context object in the second image. In some examples, the first context object is the same as the second context object, such as in an example where both the first and second images contain the same main object (e.g., shoes) and the same context object (e.g., pants), although it will be understood that the first image is not necessarily the same as the second image. For instance, the first and second images may have different scenes, poses, or colors even though the objects in the images are the same, as identified by the first neural network 704. In the case where the first and second context objects are the same, the first and second images are associated together in the same bucket or group of images and presented to the user via the GUI. To improve the quality of these associations, some embodiments identify labels corresponding to the objects visible in each of the images. Examples of such labels include where each image shows the same objects and the images are assigned the same labels so that the images are comparable. For instance, if the main object is a pair of shoes and the context object is a pair of pants, then some embodiments will associate all images labeled for the same pair of shoes and the same pair pants.

The method 1000 includes obtaining 1002, by the object identification module and from the first neural network 704, a first label associated with the main object, a second label associated with the first context object, and a third label associated with the second context object, wherein the first image is associated with the first context object based on the first and second labels, and wherein the second image is associated with the second context object based on the first and third labels. For example, one label is associated with the main object in the first image and another label is associated with the first context object in the first image, such as shown in FIG. 9. Note that the first neural network 704 is configured to generate labels for any number of images, including the first and second images, and for any number of products within those images.

The method 1000 further includes associating 1004, by the object association module, the first image to the first context object and the second image to the second context object based on the labels. For example, if the first context object and the second context object have the same labels, then the first image is associated with the second image. As described above, these associations allow the user to easily retrieve and visualize the pairings of the main object with the context object via the GUI, such as described with respect to the methods 600 and 700 of FIGS. 6 and 7. For example, if the main object is labeled "shoes" and the context object is labeled "jeans," then at least one image associated with these labels is displayed responsive to a user selection of "jeans" in the context of the shoes via the GUI 400 of FIGS. 4A-B.

Figure 11:
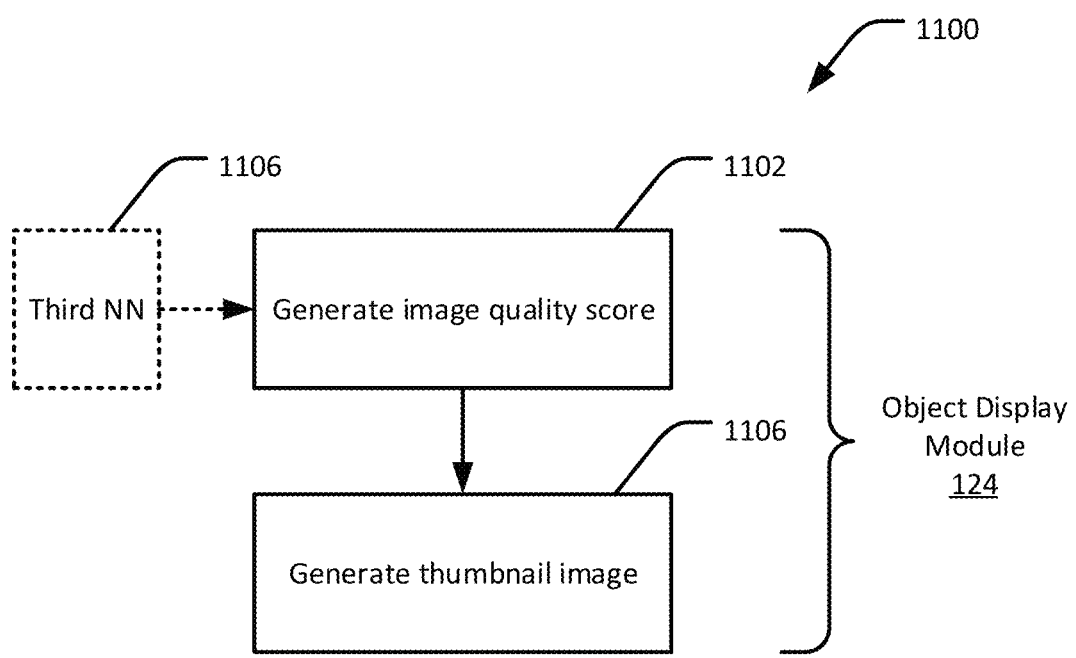
FIG. 11 is a flow diagram of an example method for generating a thumbnail image among multiple images, such as the images identified as being suitable for contextual product association and visualization in FIGS. 6 and 7, in accordance with an embodiment of the present disclosure.

FIG. 11 is a flow diagram of an example method 1100 for generating a thumbnail image among multiple images, in accordance with an embodiment of the present disclosure. The method 1100 is implemented, for example, in the system 100 of FIG. 1. As noted above, in some embodiments the content product icons 404a, 404b, 404c of the GUI 400 include thumbnail images of a representative context product. For example, if context product A is a skirt and the main product is a pair of high heel shoes, then the context product icon 404a for context product A includes a thumbnail image of a representative skirt. Similarly, if context product B is a pair of pants and the main product is a pair of high heel shoes, then the context product icon 404b for context product B includes a thumbnail image of a representative pair of pants. Further to this example, if context product C is a pair of jeans and the main product is a pair of high heel shoes, then the context product icon 404c for context product C includes a thumbnail image of a representative pair of jeans. All of the images associated with a given context are analyzed to identify the best image to use as the thumbnail for the respective context (for example, a thumbnail for a skirt, another thumbnail for a pair of pants, and yet another thumbnail for a pair of jeans). The method 1100 includes applying the first image and the second image to a third neural network 1106 configured to generate 1102, by the product display module, an image quality score for each of the first image and the second image. The third neural network 1106 includes, in some examples, a CNN model configured to compute a global aesthetics quality score along with multiple aesthetics attributes, such as interesting content, object emphasis, good lighting, and other factors for any input image. The method 1100 further includes generating 1106, by the product display module, a thumbnail image from one of the first image and the second image having the highest image quality score. The image having the highest quality score is selected as the thumbnail for the corresponding association of products that are displayed to the user via the GUI.

Figure 12:
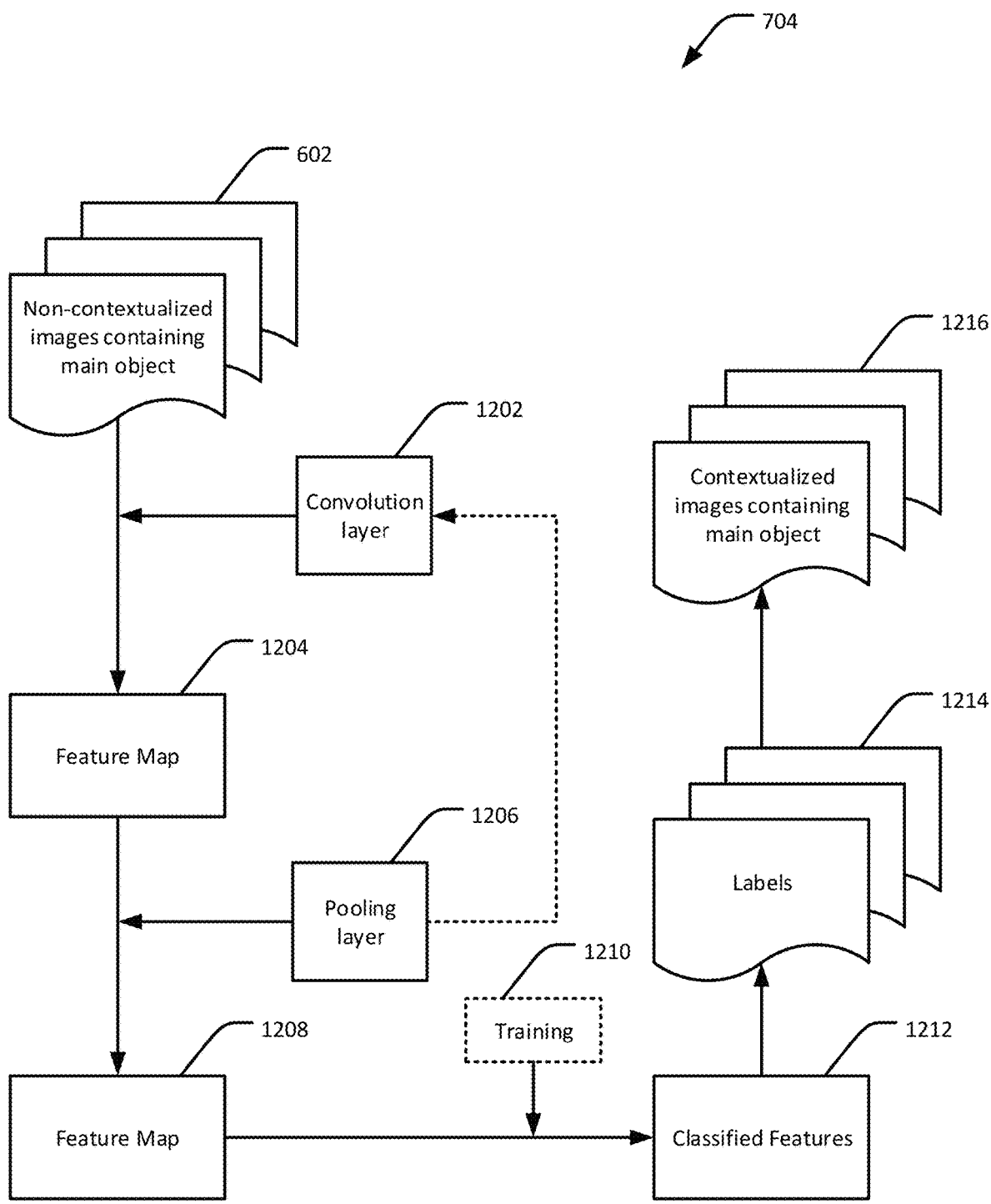
FIG. 12 is a block diagram of a neural network configured to identify one or more context objects in an image, in accordance with an embodiment of the present disclosure.

FIG. 12 is a block diagram of the first neural network 704 configured to identify a first context object in the first image, accordance with an embodiment of the present disclosure. The first neural network 704 receives, as an input, one or more non-contextualized images of one or more objects, and outputs one or more labels representing the object(s) in each image. The first neural network 704 is pre-trained to recognize objects in the images 602 using a supervised or semi-supervised training process, where the set of training images includes a variety of objects that are the same as, or similar to, the objects in the images 602. It will be understood that the first neural network 704 can be further trained to recognize additional objects as new training images become available, such as when new products are introduced to the market. In some embodiments, the first neural network 704 is implemented as a region based convolutional neural network (R-CNN), although other available neural networks may be used, as will be appreciated.

The first neural network 704 includes one or more convolutional layers 1202 and one or more pooling layers 1206 that each generate respective feature maps 1204, 1208. The convolution layer 1202 and the pooling layer 1206 extract features from the images 602 and can be repeated as many times as desired. The feature map 1204 extracted by the convolution layer 1202 and the feature map 1208 is extracted by the pooling layer 1206. The feature map 1208 is then trained 1210 to classify the features by assigning weights to neurons and pathways between neurons, resulting in a set of classified features 1212. One or more labels 1214 represent the output of the first neural network 704. For example, the labels 1214 represent classified features extracted from the non-contextualized images 602. In turn, the labels 602 are used to associate the images 602 with a context (contextualized images 1216) that can be used for image search and retrieval, as discussed above. It will be understood that the second neural network 710 and the third neural network 1106 can be constructed similar to the first neural network 704, where the difference between the neural networks lies in the training 1210. For example, different sets of image training data can be used to train the second neural network 710 and the third neural network 1106, which results in different sets of classified features 1212 and labels 1214 that are suitable for use in the respective methodologies described above.

Embodiments described herein variously provide several advantages over existing techniques, particularly in online shopping environments. For example, by associating images based on context, customers save significant time and effort when searching for and visualizing the products in contexts that are of interest because the customers do not need to manually search for thousands of images to find the desired contextual product pairings. This is especially true when the seller either provides a single context or no context with the products, whereas to cater to the needs of different customers, multiple contexts are needed to satisfy a diversity of customer preferences. This reduces that gap between the seller-provided intent and the customer intent. Furthermore, the customer can relate the product with the desired context to help make a purchasing decision quickly, which also helps to increase customer satisfaction with the product. The disclosed techniques not only help the customer locate the desired context for the products, but also help the customer to discover other contexts that the customer may not have considered. This helps customers to visualize the products in different contexts, which helps increase sales. It is also appreciated that in online shopping environments, the shopping experience is as important, if not more important, than the products themselves. Thus, the disclosed techniques for contextual product association and visualization improve upon the online shopping experience by making it more engaging, customizable, and satisfying.

FURTHER EXAMPLE EMBODIMENTS

Numerous example embodiments will be apparent, and features described herein can be combined in any number of configurations.

Example 1 is a method for determining a context of a main product and at least one context product in an image. The method includes classifying, by a product identification module, a first context product in a first image containing a main product using a first neural network having one or more product classification layers; classifying, by the product identification module, a second context product in a second image containing the main product using the first neural network; classifying, by a prominent region detection module, a common prominent feature in both the first image and the second image using a second neural network having one or more prominent feature classification layers; and associating, by a product association module and responsive to classifying the common prominent feature, the first image with the first context product and the second image with the second context product.

Example 2 includes the subject matter of Example 1, the method further including causing, by a product display module, the first image to be displayed on a display device in response to a user selection of the first context product, and the second image to be displayed on the display device in response to a user selection of the second context product.

Example 3 includes the subject matter of Examples 1 or 2, the method further including obtaining, by the product identification module and from the first neural network, a bounding box surrounding the first context product in the first image; generating, by the product identification module, a mask corresponding to the first context product within the bounding box; assigning, by the prominent region detection module, a weight to the mask; and identifying, by the prominent region detection module and from the second neural network, the common prominent feature based on the mask and the weight.

Example 4 includes the subject matter of Example 3, where the weight is a first weight, the method further including assigning, by the prominent region detection module, a second weight to a region of the first image containing the main product, and where identifying the common prominent feature is further based on a combination of the first and second weights.

Example 5 includes the subject matter of any of Examples 1-4, the method further including obtaining, by the product identification module and from the first neural network, a first label associated with the main product, a second label associated with the first context product, and a third label associated with the second context product, wherein the first image is associated with the first context product based on the first and second labels, and wherein the second image is associated with the second context product based on the first and third labels.

Example 6 includes the subject matter of Example 5, where the first neural network is a convolutional neural network (CNN) trained on a product image training dataset, the product image training dataset including the first label, the second label, and the third label.

Example 7 includes the subject matter of Examples 1-6, where the first context product is the same as the second context product, the method further including applying, by the product display module, the first image and the second image to a third neural network configured to generate an image quality score for each of the first image and the second image; and generating, by the product display module, a thumbnail image from one of the first image and the second image having the highest image quality score.

Example 8 includes the subject matter of Example 7, the method further including causing, by the product display module, the thumbnail image to be displayed on the display device in response to a user selection of the main product.

Example 9 includes the subject matter of any of Examples 1-8, wherein there are a plurality of first images containing the main product, the method further including associating, by the product association module and responsive to identifying the common prominent feature, each of the plurality of first images with the first context product; and causing, by the product display module, each of the plurality of first images to be displayed on the display device in response to a user selection of the first context product.

Example 10 is a system for determining a context of a main product and at least one context product in an image. The system includes a product identification module, executable by at least one processor, and configured to classify, using a first neural network having one or more product classification layers, a first context product in a first image containing a main product, and classify, using the first neural network, a second context product in a second image containing the main product; a prominent region detection module, executable by the at least one processor, and configured to classify, using a second neural network, a common prominent feature in both the first image and the second image; a product association module, executable by the at least one processor responsive to classifying the common prominent feature, and configured to associate the first image with the first context product, and associate the second image with the second context product; and a product display module, executable by the at least one processor, and configured to receive a user selection of the first context product or the second context product, and cause the first image to be displayed via a display device in response to the user selection of the first context product, and the second image to be displayed via the display device in response to the user selection of the second context product.

Example 11 includes the subject matter of Example 10, where the product identification module is further configured to: obtain, from the first neural network, a bounding box surrounding the first context product in the first image; wherein the product identification module is further configured to generate a mask corresponding to the first context product within the bounding box; and wherein the prominent region detection module is further configured to assign a weight to the mask, and identify, using the second neural network, the common prominent feature based on the mask and the weight.

Example 12 includes the subject matter of Examples 10 or 11, where the product identification module is further configured to obtain, from the first neural network, a first label associated with the main product, a second label associated with the first context product, and a third label associated with the second context product, wherein the first image is associated with the first context product based on the first and second labels, and wherein the second image is associated with the second context product based on the first and third labels.

Example 13 includes the subject matter of any of Examples 10-12, where the first neural network is a convolutional neural network (CNN) trained on a product image training dataset, the product image training dataset including the first label, the second label, and the third label.

Example 14 includes the subject matter of any of Examples 10-13, where the first context product is the same as the second context product, and where the product display module is further configured to: apply the first image and the second image to a third neural network configured to generate an image quality score for each of the first image and the second image; generate a thumbnail image from one of the first image and the second image having the highest image quality score; and cause the thumbnail image to be displayed on the display device in response to a user selection of the main product.

Example 15 is a computer program product including one or more non-transitory machine-readable mediums having instructions encoded thereon that when executed by at least one processor cause a process to be carried out for determining a context of a main product and at least one context product in an image. The process includes classifying a first context product in a first image containing a main product using a neural network having one or more product classification layers; classifying a second context product in a second image containing the main product using the neural network; associating the first image with the first context product and the second image with the second context product; and causing the first image to be displayed on a display device in response to a user selection of the first context product, and the second image to be displayed on the display device in response to a user selection of the second context product.

Example 16 includes the subject matter of Example 15, where the neural network is a first neural network, and the process further includes applying the first image and the second image to a second neural network to identify a common prominent feature in both the first image and the second image, where the associating occurs in response to identifying the common prominent feature.

Example 17 includes the subject matter of Examples 15 or 16, the process further including: obtaining, from the first neural network, a bounding box surrounding the first context product in the first image; generating a mask corresponding to the first context product within the bounding box; assigning a weight to the mask; and identifying, from the second neural network, the common prominent feature based on the mask and the weight.

Example 18 includes the subject matter of Example 17, where the weight is a first weight, where the process further comprises assigning a second weight to a region of the first image containing the main product, and where identifying the common prominent feature is further based on a combination of the first and second weights.

Example 19 includes the subject matter of any of Examples 15-18, the process further including obtaining, by the product identification module and from the neural network, a first label associated with the main product, a second label associated with the first context product, and a third label associated with the second context product, where the first image is associated with the first context product based on the first and second labels, and where the second image is associated with the second context product based on the first and third labels.

Example 20 includes the subject matter of any of Examples 15-19, where the neural network is a first neural network, and the first context product is the same as the second context product, and where the process further includes: applying the first image and the second image to a second neural network configured to generate an image quality score for each of the first image and the second image; generating a thumbnail image from one of the first image and the second image having the highest image quality score; and causing the thumbnail image to be displayed on the display device in response to a user selection of the main product.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It will be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for determining a context of a main product and at least one context product in an image, the method comprising:
    classifying, by a product identification module, a first context product in a feature map using a first neural network having one or more product classification layers, the feature map representing features in a first image containing the main product and in a second image containing the main product;
    classifying, by the product identification module, a second context product in the feature map using the first neural network;
    classifying, by a prominent region detection module, a common prominent feature in the feature map using a second neural network having one or more prominent feature classification layers, the common prominent feature being different from the first context product and the second context product; and
    associating, by a product association module and responsive to classifying the common prominent feature, the first image with the first context product and further associating the second image with the second context product.

2. The method of claim 1, further comprising causing, by a product display module, the first image to be displayed on a display device in response to a user selection of the first context product, and the second image to be displayed on the display device in response to a user selection of the second context product.

3. The method of claim 1, further comprising:
    obtaining, by the product identification module and from the first neural network, a bounding box surrounding the first context product in the first image;
    generating, by the product identification module, a mask corresponding to the first context product within the bounding box;
    assigning, by the prominent region detection module, a weight to the mask; and
    identifying, by the prominent region detection module and from the second neural network, the common prominent feature based on the mask and the weight.

4. The method of claim 3, wherein the weight is a first weight, wherein the method further comprises assigning, by the prominent region detection module, a second weight to a region of the first image containing the main product, and wherein identifying the common prominent feature is further based on a combination of the first and second weights.

5. The method of claim 1, further comprising obtaining, by the product identification module and from the first neural network, a first label associated with the main product, a second label associated with the first context product, and a third label associated with the second context product, wherein the first image is associated with the first context product based on the first and second labels, and wherein the second image is associated with the second context product based on the first and third labels.

6. The method of claim 5, wherein the first neural network is a convolutional neural network (CNN) trained on a product image training dataset, the product image training dataset including the first label, the second label, and the third label.

7. The method of claim 1, wherein the first context product is the same as the second context product, and wherein the method further comprises:
    applying, by the product display module, the first image and the second image to a third neural network configured to generate an image quality score for each of the first image and the second image; and
    generating, by the product display module, a thumbnail image from one of the first image and the second image having the highest image quality score.

8. The method of claim 7, further comprising causing, by the product display module, the thumbnail image to be displayed on the display device in response to a user selection of the main product.

9. The method of claim 1, wherein there are a plurality of first images containing the main product, and wherein the method further comprises:
- associating, by the product association module and responsive to identifying the common prominent feature, each of the plurality of first images with the first context product; and
- causing, by the product display module, each of the plurality of first images to be displayed on the display device in response to a user selection of the first context product.

10. A system for determining a context of a main product and at least one context product in an image, the system comprising:
- a product identification module, executable by at least one processor, and configured to
  - classify, using a first neural network having one or more product classification layers, a first context product in a feature map, the feature map representing features in a first image containing the main product and in a second image containing the main product, and
  - classify, using the first neural network, a second context product in the feature map;
- a prominent region detection module, executable by the at least one processor, and configured to classify, using a second neural network, a common prominent feature in the feature map, the common prominent feature being different from the first context product and the second context product;
- a product association module, executable by the at least one processor responsive to classifying the common prominent feature, and configured to
  - associate the first image with the first context product, and
  - associate the second image with the second context product; and
- a product display module, executable by the at least one processor, and configured to receive a user selection of the first context product or the second context product, and
  - cause the first image to be displayed via a display device in response to the user selection of the first context product, and the second image to be displayed via the display device in response to the user selection of the second context product.

11. The system of claim 10, wherein the product identification module is further configured to:
- obtain, from the first neural network, a bounding box surrounding the first context product in the first image;
- wherein the product identification module is further configured to generate a mask corresponding to the first context product within the bounding box; and
- wherein the prominent region detection module is further configured to
  - assign a weight to the mask, and
  - identify, using the second neural network, the common prominent feature based on the mask and the weight.

12. The system of claim 10, wherein the product identification module is further configured to obtain, from the first neural network, a first label associated with the main product, a second label associated with the first context product, and a third label associated with the second context product, wherein the first image is associated with the first context product based on the first and second labels, and wherein the second image is associated with the second context product based on the first and third labels.

13. The system of claim 10, wherein the first neural network is a convolutional neural network (CNN) trained on a product image training dataset, the product image training dataset including the first label, the second label, and the third label.

14. The system of claim 10, wherein the first context product is the same as the second context product, and wherein the product display module is further configured to:
- apply the first image and the second image to a third neural network configured to generate an image quality score for each of the first image and the second image;
- generate a thumbnail image from one of the first image and the second image having the highest image quality score; and
- cause the thumbnail image to be displayed on the display device in response to a user selection of the main product.

15. A computer program product including one or more non-transitory machine-readable mediums having instructions encoded thereon that when executed by at least one processor cause a process to be carried out for determining a context of a main product and at least one context product in an image, the process comprising:
- classifying a first context product in a feature map using a first neural network having one or more product classification layers, the feature map representing features in a first image containing the main product and in a second image containing the main product;
- classifying a second context product in the feature map using the first neural network;
- classifying a common prominent feature in the feature map using a second neural network having one or more prominent feature classification layers, the common prominent feature being different from the first context product and the second context product;
- associating, in response to identifying the common prominent feature, the first image with the first context product and further associating the second image with the second context product; and
- causing the first image to be displayed on a display device in response to a user selection of the first context product, and the second image to be displayed on the display device in response to a user selection of the second context product.

16. The computer program product of claim 15, wherein the common prominent feature in both the first image and the second image includes a region of a person's body.

17. The computer program product of claim 15, wherein the process further comprises:
- obtaining, from the first neural network, a bounding box surrounding the first context product in the first image;
- generating a mask corresponding to the first context product within the bounding box;
- assigning a weight to the mask; and
- identifying, from the second neural network, the common prominent feature based on the mask and the weight.

18. The computer program product of claim 17, wherein the weight is a first weight, wherein the process further comprises assigning a second weight to a region of the first image containing the main product, and wherein identifying the common prominent feature is further based on a combination of the first and second weights.

19. The computer program product of claim 15, wherein the process further comprises obtaining, by the product identification module and from the first neural network, a first label associated with the main product, a second label associated with the first context product, and a third label associated with the second context product, wherein the first image is associated with the first context product based on the first and second labels, and wherein the second image is associated with the second context product based on the first and third labels.

20. The computer program product of claim 15, wherein the first context product is the same as the second context product, and wherein the process further comprises:
- applying the first image and the second image to a third neural network configured to generate an image quality score for each of the first image and the second image;
- generating a thumbnail image from one of the first image and the second image having the highest image quality score; and
- causing the thumbnail image to be displayed on the display device in response to a user selection of the main product.

\* \* \* \* \*